US012766836B2

(12) United States Patent
Shiozawa et al.

(10) Patent No.: US 12,766,836 B2
(45) Date of Patent: Oct. 20, 2026

(54) LIQUID EJECTING HEAD AND LIQUID EJECTING APPARATUS

(71) Applicant: SEIKO EPSON CORPORATION, Tokyo (JP)

(72) Inventors: Yu Shiozawa, Shiojiri (JP); Shingo Tomimatsu, Shiojiri (JP); Motoki Takabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 165 days.

(21) Appl. No.: 18/750,270

(22) Filed: Jun. 21, 2024

(65) Prior Publication Data

US 2024/0424787 A1 Dec. 26, 2024

(30) Foreign Application Priority Data

Jun. 22, 2023 (JP) ................................ 2023-102723
Jul. 19, 2023 (JP) ................................ 2023-117620

(51) Int. Cl.
*B41J 2/14* (2006.01)

(52) U.S. Cl.
CPC .. *B41J 2/14233* (2013.01); *B41J 2002/14491* (2013.01)

(58) Field of Classification Search
CPC .......... B41J 2/14233; B41J 2002/14491; B41J 2002/14241; B41J 2002/14354; B41J 2002/14419; B41J 2/14274; B41J 2/01
See application file for complete search history.

(56) References Cited

U.S. PATENT DOCUMENTS

| | | | | |
|---|---|---|---|---|
| 6,398,329 | B1 * | 6/2002 | Boyd .................. | B41J 2/14153 347/7 |
| 2018/0264830 | A1 | 9/2018 | Tomimatsu | |
| 2021/0402772 | A1 * | 12/2021 | Takabe ................ | B41J 2/14201 |
| 2023/0249462 | A1 * | 8/2023 | Mori .................. | B41J 2/14233 347/68 |

FOREIGN PATENT DOCUMENTS

| | | | |
|---|---|---|---|
| JP | 2018-153926 | A | 10/2018 |

* cited by examiner

*Primary Examiner* — Kristal Feggins
*Assistant Examiner* — Natasha Dephenia Quinn
(74) *Attorney, Agent, or Firm* — WORKMAN NYDEGGER

(57) ABSTRACT

A liquid ejecting head includes, a pressure chamber substrate that includes a pressure chamber in which pressure for ejecting the liquid from the nozzle is applied to the liquid, and an absorption chamber that is adjacent to the pressure chamber in a second direction and absorbs vibration of the liquid generated when the pressure is applied to the liquid in the pressure chamber, a first vibration plate that is provided corresponding to the pressure chamber and vibrates to apply the pressure to the liquid, a second vibration plate that is provided corresponding to the absorption chamber and vibrates to absorb the pressure of the liquid, a second wiring portion that is provided at a position corresponding to the absorption chamber, and a pressure acquisition portion that acquires the pressure of the absorption chamber based on a resistance value of the second wiring portion.

10 Claims, 13 Drawing Sheets

LIQUID EJECTING HEAD AND LIQUID EJECTING APPARATUS

The present application is based on, and claims priority from JP Application Serial Number 2023-102723, filed Jun. 22, 2023 and JP Application Serial Number 2023-117620, filed Jul. 19, 2023, the disclosures of which are hereby incorporated by reference herein in their entirety.

BACKGROUND

1. Technical Field

The present disclosure relates to a liquid ejecting head and a liquid ejecting apparatus.

2. Related Art

In the related art, a liquid ejecting apparatus including a plurality of heads ejecting a liquid such as ink to a medium such as printing paper is proposed. In recent years, ink jet printers have attracted attention not only for printing applications but also as apparatuses that can apply a material that can be liquidized to any location. The ink jet printer includes a liquid ejecting head that ejects a liquid. As the liquid ejecting head, a head that ejects a liquid filled in a pressure chamber from a nozzle by vibrating a vibration plate constituting a wall surface of the pressure chamber with a piezoelectric element is known.

The liquid ejecting head disclosed in JP-A-2018-153926 includes a pressure chamber and a liquid storage chamber provided at a position different from the pressure chamber. Since the liquid storage chamber is provided, the pressure fluctuation due to the liquid can be effectively absorbed, and thus the stability of the ejection of the liquid from the nozzle is improved.

However, in the liquid ejecting head disclosed in JP-A-2018-153926, the pressure chamber and the liquid storage chamber are provided at positions spaced apart from each other through many members. Therefore, the absorption efficiency of the liquid vibration in the pressure chamber is low. It is considered that the absorption efficiency of the liquid vibration can be improved by providing the liquid storage chamber at the adjacent position of the pressure chamber.

Meanwhile, in the liquid ejecting head, the behavior of the liquid and the like changes largely depending on the pressure of the pressure chamber. Therefore, acquiring the pressure was an object in the related art. The inventors have found a configuration in which the pressure in the vicinity of the pressure chamber can be detected with a simple configuration by using the liquid storage chamber in a form in which the liquid storage chamber is provided at a position adjacent to the pressure chamber described above.

SUMMARY

According to an aspect of the present disclosure, a liquid ejecting head includes a nozzle substrate that is provided with a nozzle for ejecting a liquid, a pressure chamber substrate that includes a pressure chamber in which pressure for ejecting the liquid from the nozzle is applied to the liquid, and an absorption chamber that is adjacent to the pressure chamber in a second direction and absorbs vibration of the liquid generated when the pressure is applied to the liquid in the pressure chamber, a first vibration plate that is provided corresponding to the pressure chamber and vibrates to apply the pressure to the liquid, a second vibration plate that is provided corresponding to the absorption chamber and vibrates to absorb the pressure of the liquid, a second wiring portion that is provided at a position corresponding to the absorption chamber, and a pressure acquisition portion that acquires the pressure of the absorption chamber based on a resistance value of the second wiring portion.

DESCRIPTION OF EMBODIMENTS

Figure 1:
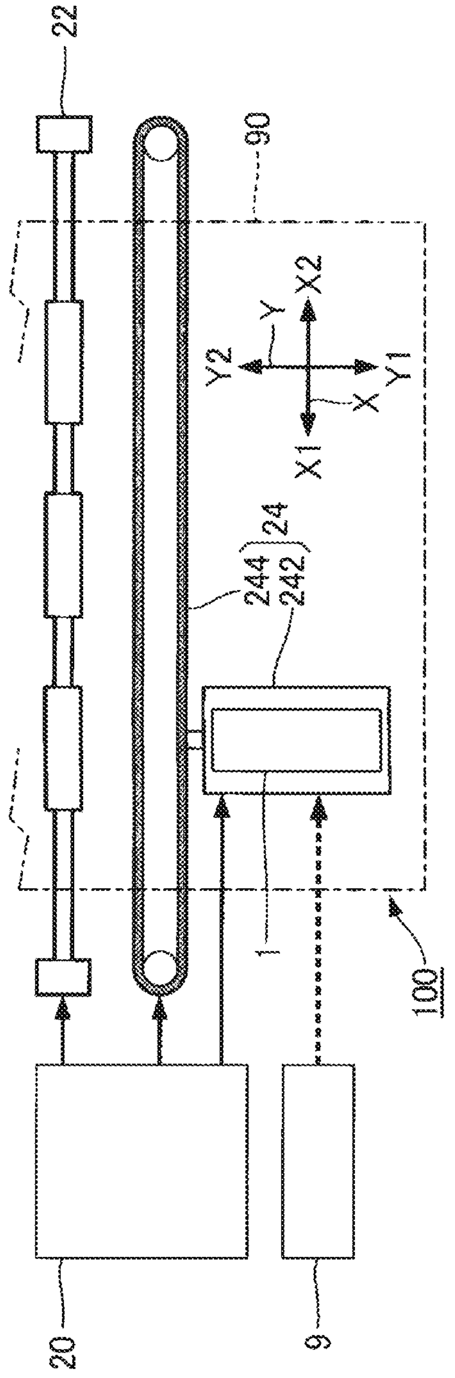
FIG. 1 is a schematic view illustrating a configuration of a liquid ejecting apparatus according to a first embodiment.

Hereinafter, preferred embodiments according to the present disclosure will be described with reference to the accompanying drawings. In the drawings, the dimensions or scales of the respective portions are appropriately different from the actual dimensions or scales, and some portions are schematically illustrated for easy understanding. Further, the scope of the present disclosure is not limited to these forms unless it is stated in the following description that the present disclosure is particularly limited. The phrase "element β on element γ" is not limited to a configuration in which the element γ is in direct contact with the element β, and also includes a configuration in which the element γ is not in direct contact with the element β. The phrase the element γ and the element β are the same" means that the element γ and the element β may be substantially the same, and includes manufacturing errors and the like.

1. First Embodiment

1-1. Overall Configuration of Liquid Ejecting Apparatus 100

FIG. 1 is a schematic view illustrating a configuration of a liquid ejecting apparatus 100 according to a first embodiment. For convenience of description, the description will be made below by appropriately using an X-axis, a Y-axis, and a Z-axis which are perpendicular to one another. In addition, one direction along the X-axis is referred to as an X1 direction, and a direction opposite to the X1 direction is referred to as an X2 direction. Similarly, one direction along the Y-axis is referred to as a Y1 direction, and a direction opposite to the Y1 direction is referred to as a Y2 direction. One direction along the Z-axis is referred to as a Z1 direction, and a direction opposite to the Z1 direction is referred to as a Z2 direction.

The liquid ejecting apparatus 100 in FIG. 1 is an ink jet printing apparatus that ejects an ink, which is an example of a liquid, to a medium 90. The medium 90 is typically printing paper, but a printing target of an arbitrary material such as a resin film or a cloth is used as the medium 90. As illustrated in FIG. 1, a liquid container 9 that stores an ink is installed in the liquid ejecting apparatus 100. For example, a cartridge that is attachable to and detachable from the liquid ejecting apparatus 100, a bag-shaped ink pack formed by a flexible film, or an ink tank that can be replenished with an ink is used as a liquid container 9.

The liquid ejecting apparatus 100 includes a control unit 20, a medium transport mechanism 22, a moving mechanism 24, and a liquid ejecting head 1. The control unit 20 includes, for example, one or a plurality of processing circuits such as a central processing unit (CPU) or a field programmable gate array (FPGA), and one or a plurality of storage circuits such as a semiconductor memory, and controls each element of the liquid ejecting apparatus 100 in an integrated manner.

The medium transport mechanism 22 transports the medium 90 in a direction along the Y-axis under the control of the control unit 20. Further, the moving mechanism 24 causes the liquid ejecting head 1 to reciprocate along the X-axis under the control of the control unit 20. The moving mechanism 24 includes a substantially box-shaped transport member 242 that accommodates the liquid ejecting head 1, and a transport belt 244 to which the transport member 242 is fixed. A configuration in which a plurality of the liquid ejecting heads 1 are mounted on the transport member 242, or a configuration in which the liquid container 9 is mounted on the transport member 242 together with the liquid ejecting head 1 may be adopted.

The liquid ejecting head 1 ejects the ink supplied from the liquid container 9, from a plurality of nozzles to the medium 90 under the control of the control unit 20. Each liquid ejecting head 1 ejects the ink to the medium 90 in parallel with the transport of the medium 90 by the medium transport mechanism 22 and the repetitive reciprocation of the transport member 242, whereby an image is formed at a surface of the medium 90.

Figure 2:
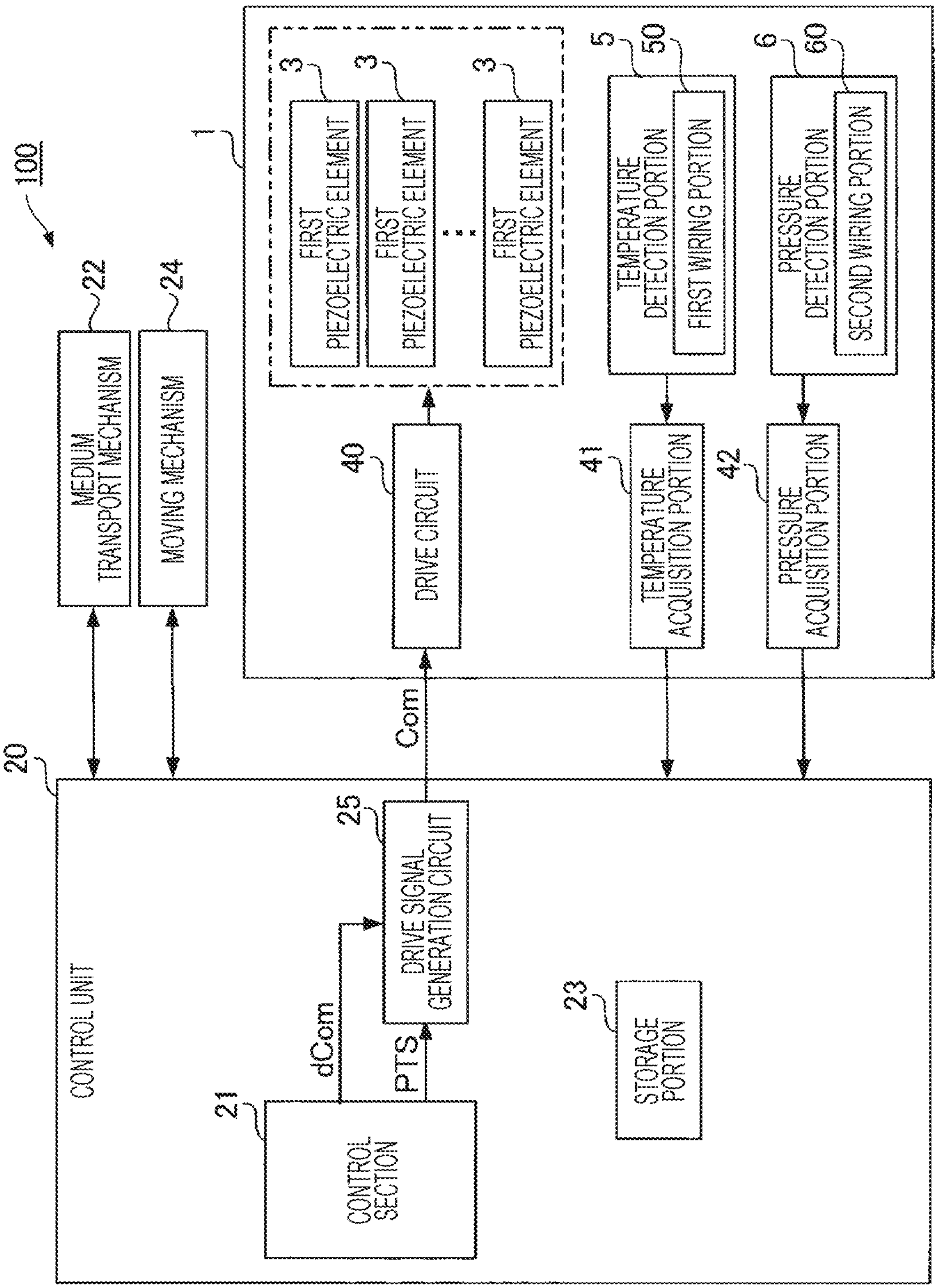
FIG. 2 is a block diagram of the liquid ejecting apparatus in FIG. 1.

FIG. 2 is a block diagram of the liquid ejecting apparatus 100 in FIG. 1. As illustrated in FIG. 2, the liquid ejecting apparatus 100 includes the control unit 20, the medium transport mechanism 22, the moving mechanism 24, and the liquid ejecting head 1. The control unit 20 includes a control section 21, a storage portion 23, and a drive signal generation circuit 25. The liquid ejecting head 1 includes a drive circuit 40, a plurality of first piezoelectric elements 3, a temperature acquisition portion 41, a pressure acquisition portion 42, a temperature detection portion 5, and a pressure detection portion 6.

The control section 21 includes, for example, one or more processing circuits such as a CPU or an FPGA. The control section 21 generates a signal for controlling the operation of each portion of the liquid ejecting apparatus 100. The control section 21 controls an ejection operation of the ink by the liquid ejecting head 1.

The control section 21 generates a print signal SI, a waveform designation signal dCom, and a timing signal PTS. The print signal SI is a digital signal for designating the type of operation of the liquid ejecting head 1. The print signal SI designates whether or not to supply a drive signal Com to the first piezoelectric element 3. The waveform designation signal dCom is a digital signal that defines a waveform of the drive signal Com. The drive signal Com is an analog signal for driving the first piezoelectric element 3. The timing signal PTS is a signal that defines a generation timing of the drive signal Com.

The storage portion 23 includes one or a plurality of storage circuits such as a semiconductor memory. The storage portion 23 stores print data Img supplied from a host computer. The storage portion 23 stores a control program of the liquid ejecting apparatus 100.

The drive signal generation circuit 25 includes a DA conversion circuit. The drive signal generation circuit 25 generates the drive signal Com having a waveform defined by the waveform designation signal dCom. The drive signal generation circuit 25 outputs the drive signal Com each time the timing signal PTS is received.

The drive circuit 40 switches whether or not to supply the drive signal Com to each first piezoelectric element 3 based on the print signal SI. The drive circuit 40 selects the first piezoelectric element 3 to which the drive signal Com is to be supplied, based on the print signal SI, a latch signal LAT, and a change signal CH, which are supplied from the control unit 20. The latch signal LAT defines a latch timing of print data Img. The change signal CH defines a selection timing of a drive pulse included in the drive signal Com.

The temperature acquisition portion 41 acquires the temperature of an absorption chamber S2 of the liquid ejecting head 1 to be described later, based on the resistance value of a first wiring portion 50 included in the temperature detection portion 5. The pressure acquisition portion 42 acquires the pressure of the absorption chamber S2 based on the resistance value of a second wiring portion 60 included in the pressure detection portion 6.

1-2. Liquid Ejecting Head 1

Figure 3:
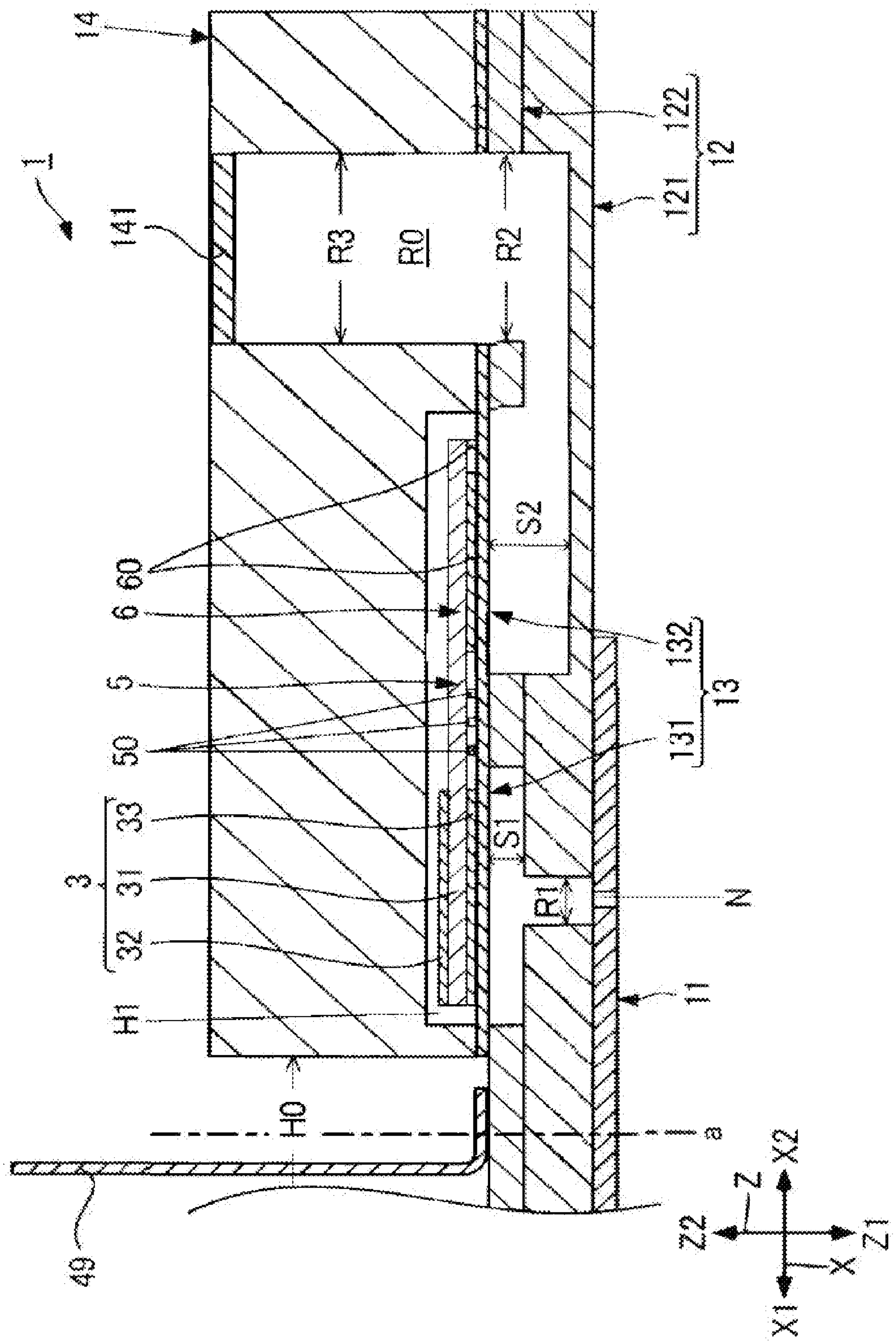
FIG. 3 is a partial cross-sectional view of a liquid ejecting head illustrated in FIG. 1.

FIG. 3 is a partial cross-sectional view of the liquid ejecting head 1 illustrated in FIG. 1, and is a view of a cross section parallel to an X-Z plane. The Z-axis is an axis along an ink ejection direction by the liquid ejecting head 1. A direction along the Z-axis is set to an up-down direction". The Z2 direction is an example of one side in the up-down direction", and the Z1 direction is an example of the other side in the up-down direction". In addition, viewing from the direction along the Z-axis, which intersects the Y2 direction and the X2 direction, is set to a plan view". The Y1 direction or the Y2 direction is an example of a first direction". The X1 direction or the X2 direction is an example of a second direction".

The liquid ejecting head 1 in FIG. 3 has a structure that is substantially plane-symmetrical with respect to a virtual plane a along a Y-Z plane. In the following description, a configuration on the right side of the virtual plane a in FIG. 3 will be mainly described, and the description of a configuration on the left side of the virtual plane a in FIG. 3 will be appropriately omitted.

The liquid ejecting head 1 includes a nozzle substrate 11, a pressure chamber substrate 12, a vibration plate 13, a sealing substrate 14, a wiring substrate 49, a first piezoelectric element 3, a pressure detection portion 6, and a temperature detection portion 5. The first piezoelectric element 3 includes a first piezoelectric member 31, a first electrode 32, and a second electrode 33. The pressure detection portion 6 includes a second wiring portion 60. The temperature detection portion 5 includes a first wiring portion 50. In addition, although not illustrated in detail, the nozzle substrate 11, the pressure chamber substrate 12, the vibration plate 13, and the sealing substrate 14 have a long plate shape along the Y-axis.

The nozzle substrate 11 is a plate-shaped member provided with a plurality of nozzles N that ejects ink, which is an example of a liquid. Each of the plurality of nozzles N is a circular through-hole through which the ink is ejected. The plurality of nozzles N are arranged linearly along the Y-axis. The nozzle substrate 11 is manufactured by processing a semiconductor substrate such as a single crystal substrate of silicon, for example.

The pressure chamber substrate 12 is a flow path structure in which a flow path for supplying the ink to each of the plurality of nozzles N is formed. The pressure chamber substrate 12 is a laminate of a first substrate 121 and a second substrate 122. Each of the first substrate 121 and the second substrate 122 is manufactured by processing a semiconductor substrate such as a single crystal substrate of silicon, for example. Each of the first substrate 121 and the second substrate 122 may be integrally formed. In addition, the pressure chamber substrate 12 may include a member other than the first substrate 121 and the second substrate 122.

The flow path of the ink is formed in the pressure chamber substrate 12. Specifically, a plurality of pressure chambers S1, an absorption chamber S2, a plurality of first communication flow paths R1, and a second communication flow path R2 are formed in the pressure chamber substrate 12. Each of the first substrate 121 and the second substrate 122 has a recess or a through-hole. The plurality of pressure chambers S1, the absorption chamber S2, the plurality of first communication flow paths R1, and the second communication flow path R2 are formed by the recesses or the through-holes.

Figure 4:
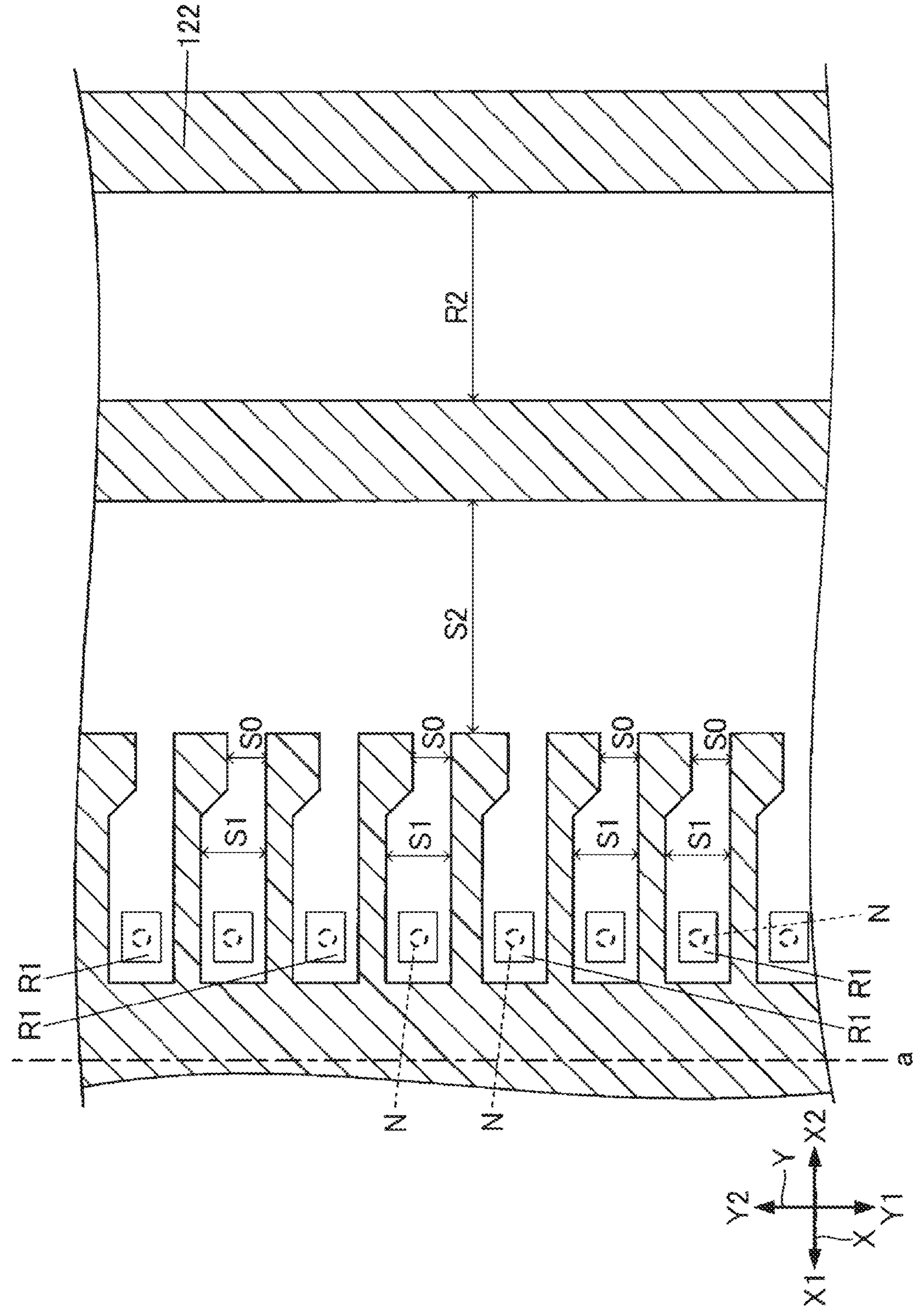
FIG. 4 is a view illustrating a portion of a pressure chamber substrate in FIG. 3.

FIG. 4 is a view illustrating a portion of the pressure chamber substrate 12 in FIG. 3. As illustrated in FIG. 4, each pressure chamber S1 has a longitudinal shape extending in the X2 direction. The plurality of pressure chambers S1 are spaced apart from each other and are arranged in the Y2 direction. Thus, a direction in which the plurality of pressure chambers S1 are arranged is the Y2 direction, which is the first direction". In addition, the plurality of pressure chambers S1 are provided in a one-to-one relationship with the plurality of nozzles N. Each pressure chamber S1 is a space in which pressure for ejecting the ink from the nozzle N is applied to the ink.

The plurality of first communication flow paths R1 are spaced apart from each other and are arranged in the Y2 direction. The plurality of first communication flow paths R1 are provided in a one-to-one relationship with the plurality of pressure chambers S1. Each of the first communication flow paths R1 communicates the corresponding pressure chamber S1 and the nozzle N. The respective first communication flow paths R1 overlap the corresponding pressure chambers S1 and the nozzles N in a plan view.

The absorption chamber S2 is provided upstream of the plurality of pressure chambers S1. A direction in which the pressure chambers S1 and the absorption chamber S2 are arranged is the X2 direction which is the second direction". The absorption chamber S2 has a longitudinal shape extending in the Y2 direction. The volume of the absorption chamber S2 is much larger than the volume of each pressure chamber S1. The absorption chamber S2 is provided in common for the plurality of pressure chambers S1 and is coupled to the plurality of pressure chambers S1 via a plurality of communication flow paths S0. The absorption chamber S2 is adjacent to the pressure chamber S1 to absorb the vibration of the ink generated when the pressure is applied to the ink in the pressure chamber S1. By providing the absorption chamber S2, it is possible to stabilize the ejection performance of the ink. Further, since the absorption chamber S2 is adjacent to the pressure chamber S1, it is possible to enhance the absorption efficiency of the vibration of the ink as compared with a case where the absorption chamber S2 is spaced apart from the pressure chamber S1. As a result, it is possible to enhance the stability of the ejection performance of the ink.

The second communication flow path R2 is provided upstream of the absorption chamber S2 and is coupled to the absorption chamber S2. The second communication flow path R2 has a longitudinal shape extending in the Y2 direction.

As illustrated in FIG. 3, the vibration plate 13 is disposed on the surface of the pressure chamber substrate 12 in the Z2 direction. The thickness of the vibration plate 13 is much thinner than the thickness of each of the first substrate 121 and the second substrate 122 of the pressure chamber substrate 12. The thickness is a length in the Z1 direction. The vibration plate 13 is elastically deformable. The vibration plate 13 includes a plurality of first vibration plates 131 and a second vibration plate 132. The plurality of first vibration plates 131 and the second vibration plate 132 are formed by one member.

The plurality of first vibration plates 131 are provided in a one-to-one relationship with the plurality of pressure chambers S1. Each of the first vibration plates 131 is a portion of the vibration plate 13, which overlaps the plurality of pressure chambers S1 in a plan view. Each of the first vibration plates 131 forms a portion of the pressure chamber S1. Each of the first vibration plates 131 vibrates by applying a voltage to the first piezoelectric member 31 of the first piezoelectric element 3, thereby applying pressure to the pressure chamber S1. Thus, the first vibration plate 131 is provided corresponding to the pressure chamber S1 and vibrates to apply pressure to the ink.

The second vibration plate 132 is a portion of the vibration plate 13, which overlaps the absorption chamber S2 in a plan view. The second vibration plate 132 forms a portion of the absorption chamber S2. The second vibration plate 132 is provided corresponding to the absorption chamber S2 and vibrates to absorb the pressure of the ink. The second vibration plate 132 vibrates by the pressure applied from the absorption chamber S2, and applies pressure to the second wiring portion 60 disposed on the second vibration plate 132.

In addition, the plurality of first vibration plates 131 are not separated from the second vibration plate 132, and the plurality of first vibration plates 131 and the second vibration plate 132 are formed by a continuous member. Therefore, it is easy to make the first vibration plate 131 and the second vibration plate 132 adjacent to each other. Therefore, the plurality of pressure chambers S1 and the absorption chamber S2 are easily adjacent to each other. Since the plurality of pressure chambers S1 and the absorption chamber S2 can be made adjacent to each other, it is possible to enhance the absorption efficiency of the vibration of the ink.

The vibration plate 13 is manufactured by processing a semiconductor substrate such as a single crystal substrate of silicon, for example. The vibration plate 13 may be formed by a portion of the pressure chamber substrate 12. For example, the vibration plate 13 may be formed by thinning a portion of the second substrate 122.

The sealing substrate 14 is disposed on the surface of the vibration plate 13 in the Z2 direction. The sealing substrate 14 is a structure that protects a plurality of the first piezoelectric elements 3 and the like to be described later and reinforces the mechanical strength of the pressure chamber substrate 12.

A third communication flow path R3, a first space H1, and a wiring space H0 are formed in the sealing substrate 14. The sealing substrate 14 has a recess or a through-hole, and each flow path or space is formed by the recess or the through-hole. Each of the third communication flow path R3 and the wiring space H0 is a hole penetrating the sealing substrate 14. The first space H1 is a space surrounded by a recess formed in the sealing substrate 14.

The third communication flow path R3 overlaps the second communication flow path R2 in a plan view, and is coupled to the second communication flow path R2. A common ink chamber R0 is formed by the third communication flow path R3 and the second communication flow path R2. The common ink chamber R0 functions as a reservoir. A filter 141 that removes air bubbles and foreign matters contained in the ink is provided in a portion overlapping the common ink chamber R0 in a plan view. The filter 141 may be omitted.

Although not illustrated, each of the first space H1, the third communication flow path R3, and the wiring space H0 has a longitudinal shape extending in the Y2 direction. The wiring space H0, the first space H1, and the third communication flow path R3 are arranged in this order in the X2 direction.

As illustrated in FIG. 3, the plurality of first piezoelectric elements 3, the first wiring portion 50, and the second wiring portion 60 are disposed in the first space H1. The wiring substrate 49 is disposed in the wiring space H0. The wiring substrate 49 is bonded to the pressure chamber substrate 12. The wiring substrate 49 is a mounting component on which a plurality of wirings for electrically coupling the control unit 20 and the liquid ejecting head 1 are formed. As the wiring substrate 49, for example, a tape carrier package (TCP), a flexible printed circuit (FPC), or the like is used.

Figure 5:
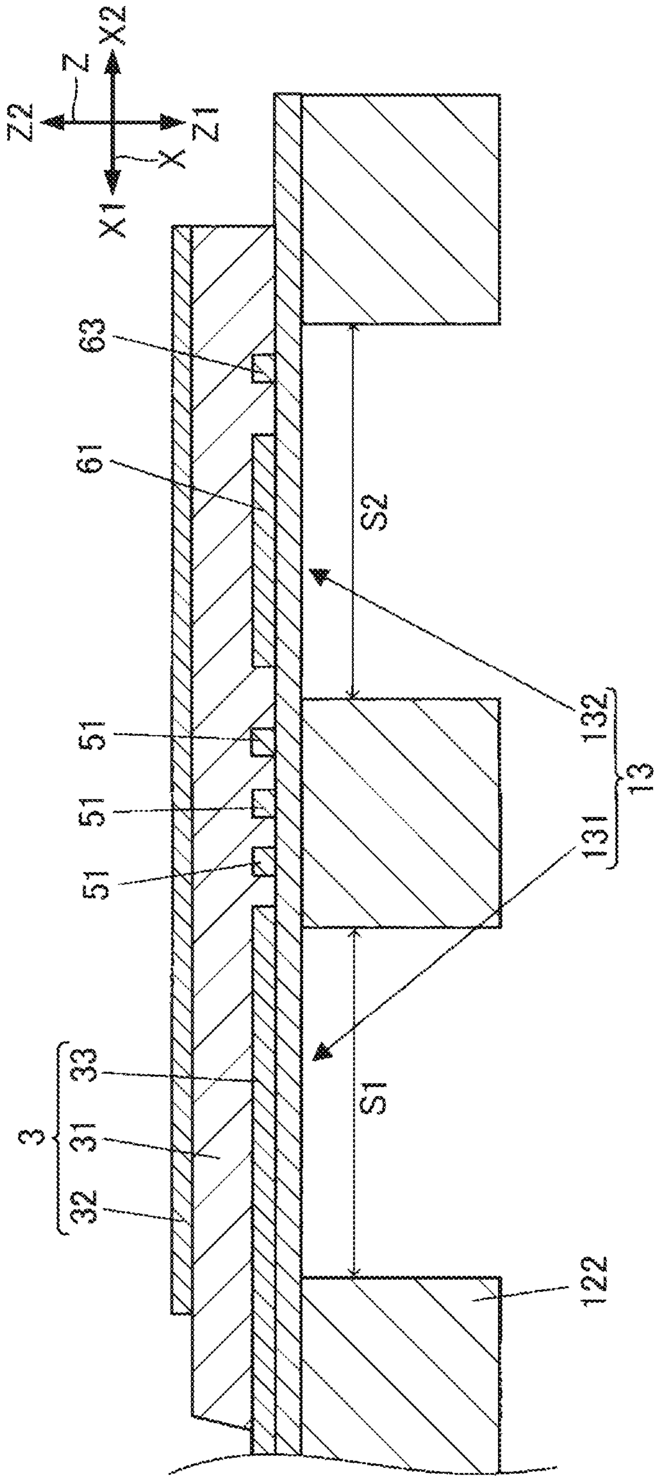
FIG. 5 is a cross-sectional view of a first piezoelectric element, a first wiring portion, and a second wiring portion in FIG. 3.

FIG. 5 is a partial cross-sectional view of the first piezoelectric element 3, the first wiring portion 50, and the second wiring portion 60 in FIG. 3. The first piezoelectric element 3, the first wiring portion 50, and the second wiring portion 60 are disposed on the vibration plate 13. The first piezoelectric element 3 is mainly disposed on the first vibration plate 131 and is located on the pressure chamber S1. The second wiring portion 60 is disposed on the second vibration plate 132 and is located on the absorption chamber S2. The first wiring portion 50 does not overlap the plurality of pressure chambers S1 and the absorption chamber S2 in a plan view.

The first piezoelectric element 3 is disposed on the surface of the first vibration plate 131 opposite to the pressure chamber S1. The first piezoelectric element 3 has a longitudinal shape extending in the X2 direction. The first piezoelectric element 3 is provided corresponding to the pressure chamber S1, and is provided for each pressure chamber S1. The plurality of first piezoelectric elements 3 are spaced apart from each other and are arranged in the Y2 direction.

The first piezoelectric element 3 is an energy generation element that generates energy for ejecting the ink by application of the drive signal Com. In addition, the first piezoelectric element 3 is also a drive element that drives by the application of the drive signal Com. The first piezoelectric member 31 of the first piezoelectric element 3 contracts when a voltage is applied, bends the first vibration plate 131, and pressurizes the pressure chamber S1.

The first piezoelectric element 3 schematically includes the second electrode 33, the first piezoelectric member 31, and the first electrode 32. The second electrode 33, the first piezoelectric member 31, and the first electrode 32 are stacked in this order from the first vibration plate 131. Thus, the first electrode 32 is located in the Z2 direction, which is an upward direction" in the one side in the up-down direction" with respect to the first piezoelectric member 31. The second electrode 33 is located in the Z1 direction, which is a downward direction" in the other side in the up-down direction" with respect to the first piezoelectric member 31. By providing the first electrode 32 and the second electrode 33, the pressure is efficiently applied to the first piezoelectric member 31. The second electrode 33 and the first vibration plate 131 may be in contact with each other, and another member may be interposed between the second electrode 33 and the first vibration plate 131.

Figure 6:
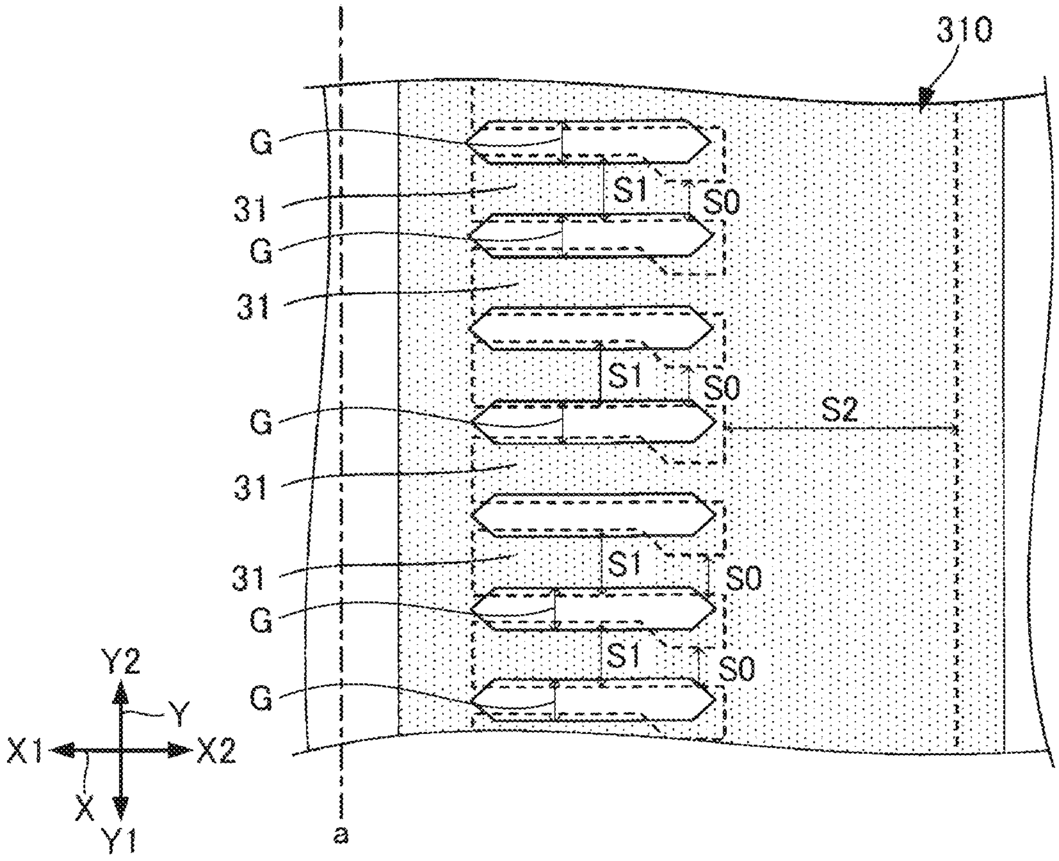
FIG. 6 is a view illustrating some of first piezoelectric members in FIG. 3.

FIG. 6 is a view illustrating some of the first piezoelectric members 31 in FIG. 3. In the example of FIG. 6, the plurality of first piezoelectric members 31 are coupled to each other. Specifically, the plurality of first piezoelectric members 31 are separated by forming a plurality of notches G in a band-shaped dielectric film 310 extending along the Y2 direction. The first piezoelectric member 31 is formed of a known piezoelectric material such as lead zirconate titanate ($Pb(Zr, Ti)O_3$), for example.

In addition, in the example of FIG. 6, the dielectric film 310 overlaps the absorption chamber S2. The dielectric film 310 may not overlap the absorption chamber S2. In addition, the plurality of first piezoelectric members 31 may not be coupled to each other and may be individually formed.

The first electrode 32 illustrated in FIG. 3 is a common electrode provided in common for the plurality of first piezoelectric members 31. The first electrode 32 has a band shape that extends in the Y2 direction to be continuous over the plurality of first piezoelectric elements 3. Since the first electrode 32 is provided in common for the plurality of pressure chambers S1, it is easier to thin the first piezoelectric element 3 as compared to the case of being individual. The first electrode 32 is formed of, for example, a low-resistance conductive material such as platinum (Pt) or iridium (Ir), similar to the second electrode 33.

Figure 7:
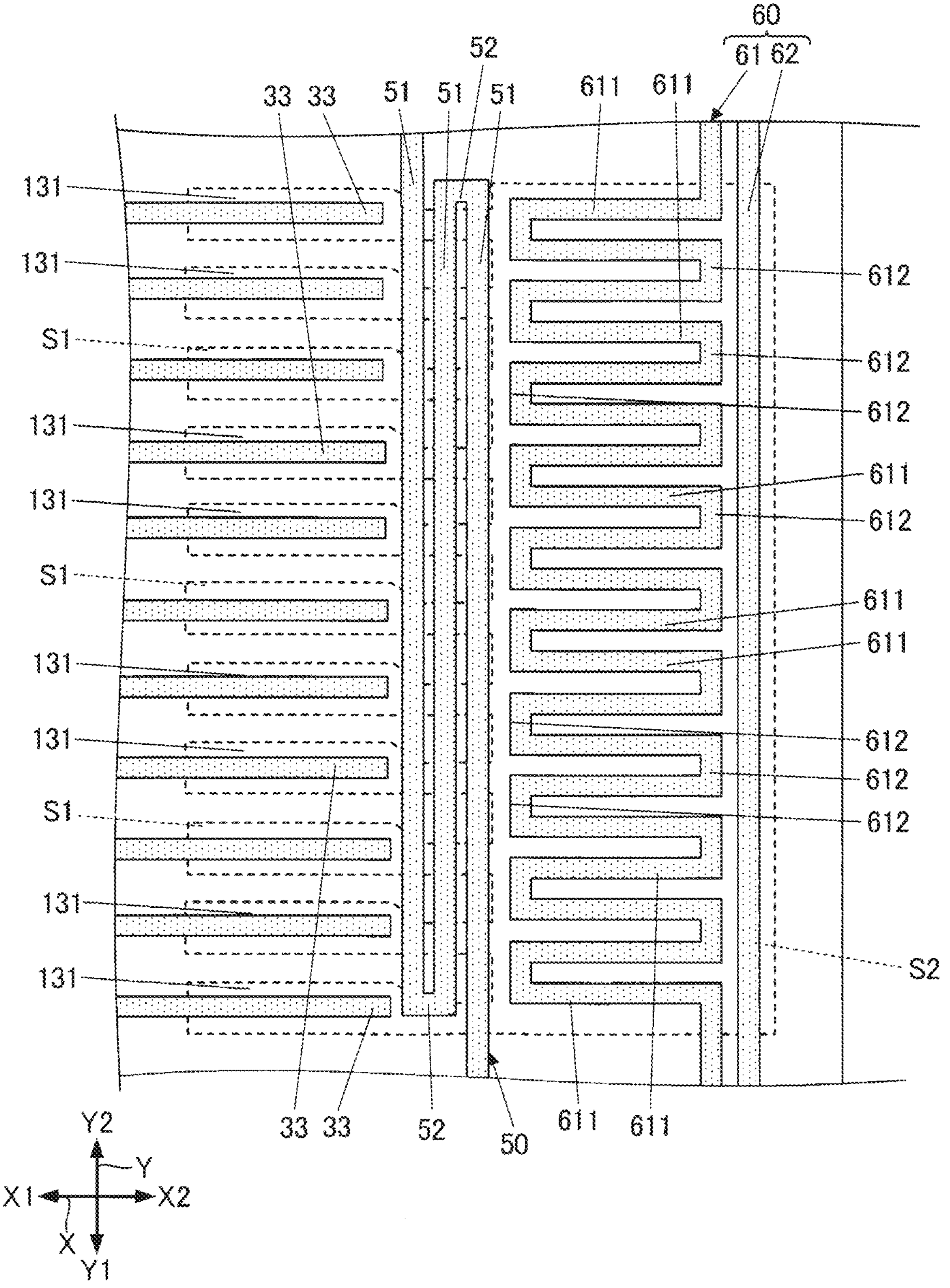
FIG. 7 is a view illustrating a second electrode, the first wiring portion, and the second wiring portion in FIG. 2.

FIG. 7 is a view illustrating the second electrode 33, the first wiring portion 50, and the second wiring portion 60 in FIG. 2. As illustrated in FIG. 7, the second electrode 33 has an elongated shape along the X-axis. A plurality of second electrodes 33 are spaced apart from each other and are arranged along the Y-axis. The second electrodes 33 are individual electrodes formed to be spaced apart from each other for each first piezoelectric element 3. The second electrodes 33 are individually provided for the plurality of pressure chambers S1. By being individually provided, even when the plurality of first piezoelectric members 31 are formed by one dielectric film 310, one dielectric film 310 can be divided into the plurality of first piezoelectric members 31. The second electrode 33 is formed of a conductive material such as platinum or iridium, for example.

The first piezoelectric element 3 is a piezoelectric element related to ejection of the ink. A reference voltage, which is a constant voltage, is applied to the first electrode 32. The reference voltage may be, for example, a ground voltage or a voltage higher than the ground voltage. The drive signal Com is supplied to the second electrode 33. As a result, a drive voltage that changes with time is applied to the second electrode 33.

A voltage corresponding to a difference between the reference voltage applied to the first electrode 32 and the drive voltage supplied to the second electrode 33 is applied to the first piezoelectric member 31. Thus, the drive circuit 40 described above in FIG. 2 applies the drive voltage that changes with time to the first piezoelectric member 31. Since the voltage corresponding to the difference between the reference voltage applied to the first electrode 32 and the drive voltage supplied to the second electrode 33 is applied to the first piezoelectric member 31, the first piezoelectric element 3 generates energy that bends and deforms the first vibration plate 131. As a result, the first piezoelectric element 3 applies pressure to the pressure chamber S1 by the application of the voltage. Since the first vibration plate 131 is bent and deformed by the energy generated by the first piezoelectric element 3, the pressure in the pressure chamber S1 changes, and the ink in the pressure chamber S1 is ejected from the nozzle N illustrated in FIG. 3.

The second wiring portion 60 illustrated in FIG. 3 is provided corresponding to the absorption chamber S2. Specifically, the second wiring portion 60 is disposed on the surface of the second vibration plate 132 opposite to the absorption chamber S2. Further, the second wiring portion 60 is covered with the dielectric film 310. The second wiring portion 60 is used to detect the pressure of the absorption chamber S2. The second wiring portion 60 is a distortion gauge. The second wiring portion 60 is formed of metal, a semiconductor, or the like.

The pressure in the absorption chamber S2 is detected by using a characteristic that the electric resistance value of metal, a semiconductor, or the like changes due to an occurrence of distortion. When an external force is applied to the second wiring portion 60 via the second vibration plate 132 in accordance with the pressure of the absorption chamber S2, stress corresponding to the external force is applied to the second wiring portion 60. As a result, the second wiring portion 60 is distorted, and the resistance value changes. By using this resistance value, the pressure of the absorption chamber S2 can be detected.

As described above, in the liquid ejecting head 1 in the present embodiment, the pressure chamber S1 and the absorption chamber S2 are provided in the pressure chamber substrate 12, and the pressure chamber S1 and the absorption chamber S2 are adjacent to each other. In the form in which the pressure chamber S1 and the absorption chamber S2 are adjacent to each other, the second wiring portion 60 is provided corresponding to the second vibration plate 132. The liquid ejecting head 1 is provided with the pressure acquisition portion 42 that acquires the pressure of the absorption chamber S2 based on the resistance value of the second wiring portion 60. For example, the pressure acquisition portion 42 includes a detection circuit that acquires an output voltage based on the resistance value of the second wiring portion 60. The pressure acquisition portion 42 detects the pressure of the absorption chamber S2 based on a correspondence relationship between the resistance value of the second wiring portion 60, which is stored in the storage portion 23, and the pressure.

As described above, the absorption chamber S2 is a space for absorbing the vibration of the ink generated when the pressure is applied to the ink in the pressure chamber S1. By providing the absorption chamber S2, it is possible to stabilize the ejection performance of the ink. In the present embodiment, the second wiring portion 60 is provided corresponding to the second vibration plate 132 corresponding to the absorption chamber S2, and thus it is possible to detect the pressure of the absorption chamber S2 based on the resistance value of the second wiring portion 60. Therefore, it is possible to detect the pressure in the vicinity of the pressure chamber S1 by using the absorption chamber S2. Therefore, it is possible to detect the pressure in the vicinity of the pressure chamber S1 with a simple configuration without separately forming a space or the like for detecting the pressure in the vicinity of the pressure chamber S1. Since the pressure of the absorption chamber S2 in the vicinity of the pressure chamber S1 can be acquired, it is possible to detect the behavior of the ink according to the pressure of the pressure chamber S1. Therefore, for example, it is possible to detect whether or not various problems such as insufficient supply of the ink to the plurality of pressure chambers S1 and absorption chambers S2 have occurred. As a result, since the pressure of the absorption chamber S2 in the vicinity of the pressure chamber S1 can be acquired, it is possible to contribute to the improvement in quality of the liquid ejecting head 1.

Further, the absorption chamber S2 is not directly related to the ink ejection as in the pressure chamber S1. Therefore, it is possible to normally detect the pressure of the absorption chamber S2 based on the resistance value of the second wiring portion 60 regardless of the ink ejection.

Further, the second wiring portion 60 is provided at a position overlapping the absorption chamber S2 in a plan view. Therefore, the resistance value of the second wiring portion 60 is likely to be influenced by the pressure change of the absorption chamber S2. By providing the second wiring portion 60 at the position overlapping the absorption chamber S2, it is possible to detect the pressure of the absorption chamber S2 with higher accuracy than that when the second wiring portion 60 is not provided.

As illustrated in FIG. 7, the second wiring portion 60 includes a first bellows portion 61 and a first straight line portion 62. The first bellows portion 61 has a second bellows shape that is sequentially folded along the Y2 direction while extending along the X2 direction. The first straight line portion 62 has a straight line shape extending along the Y2 direction.

The first bellows portion 61 includes a plurality of first portions 611 and a plurality of second portions 612. The plurality of first portions 611 are portions extending in the X2 direction, and are arranged in the Y2 direction to be spaced apart from each other. The plurality of second portions 612 are portions extending in the Y2 direction. Each second portion 612 is disposed between two adjacent first portions 611 and couples the two adjacent first portions 611. The plurality of second portions 612 are alternately disposed at the end of the first portion 611 in the X1 direction and the end of the first portion 611 in the X2 direction. The plurality of second portions 612 are counted in the Y2 direction by setting the second portion 612 located foremost in the Y1 direction among the plurality of second portions 612 to be the first. In this case, for example, the odd-numbered second portion 612 among the plurality of second portions 612 is coupled to the end of the first portion 611 in the X1 direction. The even-numbered second portion 612 among the plurality of second portions 612 is coupled to the end of the first portion 611 in the X2 direction.

The length of one first portion 611 is longer than the length of one second portion 612. As a result, the first bellows portion 61 has a shape in which the first bellows portion 61 is bent alternately in the X1 direction and the X2 direction by the first portion 611, and is gradually shifted along the Y2 direction by the second portion 612, and thus the first bellows portion 61 extends along the Y2 direction as a whole. Such a shape is referred to as a shape of being folded sequentially while extending along the X2 direction".

The first bellows portion 61 of the second wiring portion 60 is configured to have a second bellows shape that is folded sequentially while extending along the Y1 direction. Therefore, since the first bellows portion 61 has the second bellows shape, the distortion is likely to change due to the pressure and is likely to be expressed as a change in the resistance value as compared with a case where the first bellows portion 61 has a bellows shape that is folded sequentially while extending in the X1 direction. As a result, it is possible to increase the sensitivity.

The first bellows portion 61 and the first straight line portion 62 are coupled to each other. For example, one end of the first bellows portion 61 and one end of the first straight line portion 62 are coupled to each other via a wiring (not illustrated).

Figure 8:
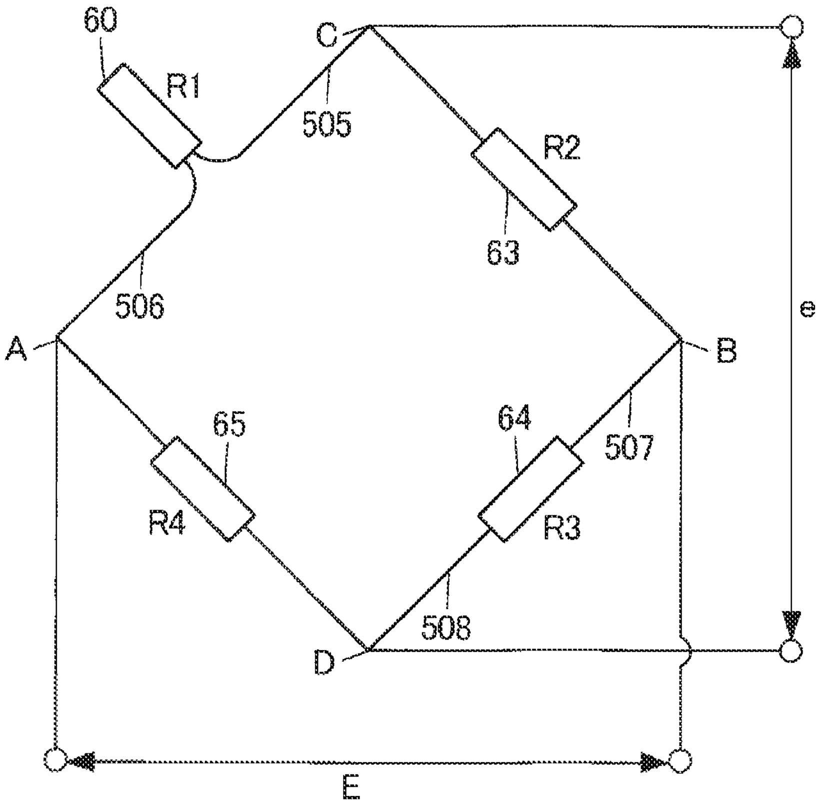
FIG. 8 is a view illustrating a bridge circuit of a pressure detection portion in FIG. 2.

FIG. 8 is a view illustrating a bridge circuit of the pressure detection portion 6 in FIG. 2. As illustrated in FIG. 8, the pressure detection portion 6 includes a first resistance element 63, a second resistance element 64, and a third resistance element 65 in addition to the first wiring portion 50 described above. The first wiring portion 50, the first resistance element 63, the second resistance element 64, and the third resistance element 65 constitute a Wheatstone bridge circuit. One of the other end of the first bellows portion 61 and the other end of the first straight line portion 62 in the first wiring portion 50 in FIG. 6 is coupled to the first resistance element 63 via a wiring 505. The other of the other ends is coupled to the third resistance element 65 via a wiring 506. The first resistance element 63 is coupled to the second resistance element 64 via a wiring 507. The second resistance element 64 is coupled to the third resistance element 65 via a wiring 508.

In this bridge circuit, a voltage E is applied to the A point and the B point, and an output voltage e from the C point and the D point is detected. When the resistance value of the first wiring portion 50 changes, a voltage difference occurs between the C point and the D point. The voltage difference, that is, the output voltage e is acquired, and the distortion of the second wiring portion 60 is obtained. The relationship between the output voltage e, the distortion, and the pressure is stored in the storage portion 23 in advance. Therefore, the pressure of the absorption chamber S2 can be obtained based on the output voltage e based on the resistance value.

Although not illustrated in FIG. 2, a power supply circuit that supplies the voltage E to the A point and the B point is coupled to the bridge circuit of the pressure detection portion 6. In addition, a detection circuit that detects the output voltage e based on the resistance value of the second wiring portion 60 is coupled to the bridge circuit of the pressure acquisition portion 42. The pressure acquisition portion 42 in FIG. 2 includes the detection circuit.

As described above, the pressure detection portion 6 includes the first resistance element 63, the second resistance element 64, and the third resistance element 65 in addition to the second wiring portion 60, and thus, the Wheatstone bridge circuit can be constituted. As a result, it is possible to detect the minute pressure of the absorption chamber S2 by using the output voltage e based on the resistance value of the first wiring portion 50.

As illustrated in FIG. 5, the first wiring portion 50 is disposed between the plurality of second electrodes 33 and the second wiring portion 60. The first wiring portion 50 is disposed on the vibration plate 13 and is provided in the same layer as the plurality of second electrodes 33 and the second wiring portion 60. The first wiring portion 50 is covered with the dielectric film 310. The first wiring portion 50 is a resistor used to detect the temperature of the absorption chamber S2.

As illustrated in FIG. 7, the first wiring portion 50 has a first bellows shape that is folded sequentially while extending in the Y2 direction. The first wiring portion 50 includes a plurality of third portions 51 and a plurality of fourth portions 52. The plurality of third portions 51 are portions extending in the Y2 direction, and are arranged in the X2 direction to be spaced apart from each other. In the example illustrated in FIG. 7, three third portions 51 are provided. The plurality of fourth portions 52 are portions extending in the X2 direction. Each fourth portion 52 is disposed between two adjacent third portions 51 and couples the two adjacent third portions 51. In the example illustrated in FIG. 7, two fourth portions 52 are provided. One of the fourth portions 52 extends in the X2 direction from the end of the third portion 51 located at the center among the three third portions 51 in the Y2 direction. The other of the fourth portions 52 extends in the X1 direction from the end of the third portion 51 located at the center among the three third portions 51 in the Y1 direction.

The length of one third portion 51 is longer than the length of one fourth portion 52. As a result, the first wiring portion 50 has a shape in which the first wiring portion 50 is bent alternately in the Y1 direction and the Y2 direction by the third portion 51, and is gradually shifted along the X2 direction by the fourth portion 52, and thus the first wiring portion 50 extends along the Y2 direction as a whole. Such a shape is referred to as a shape of being folded sequentially while extending along the Y2 direction".

As described above, the first wiring portion 50 is configured to have the first bellows shape that is folded sequentially while extending in the Y2 direction. Therefore, for example, the first wiring portion 50 can be disposed to be thin and long in a narrow region, which is a region between the pressure chamber S1 and the absorption chamber S2 in a plan view. Therefore, it is possible to increase the resistance of the first wiring portion 50. As a result, it is possible to detect the temperature change with high sensitivity.

Figure 9:
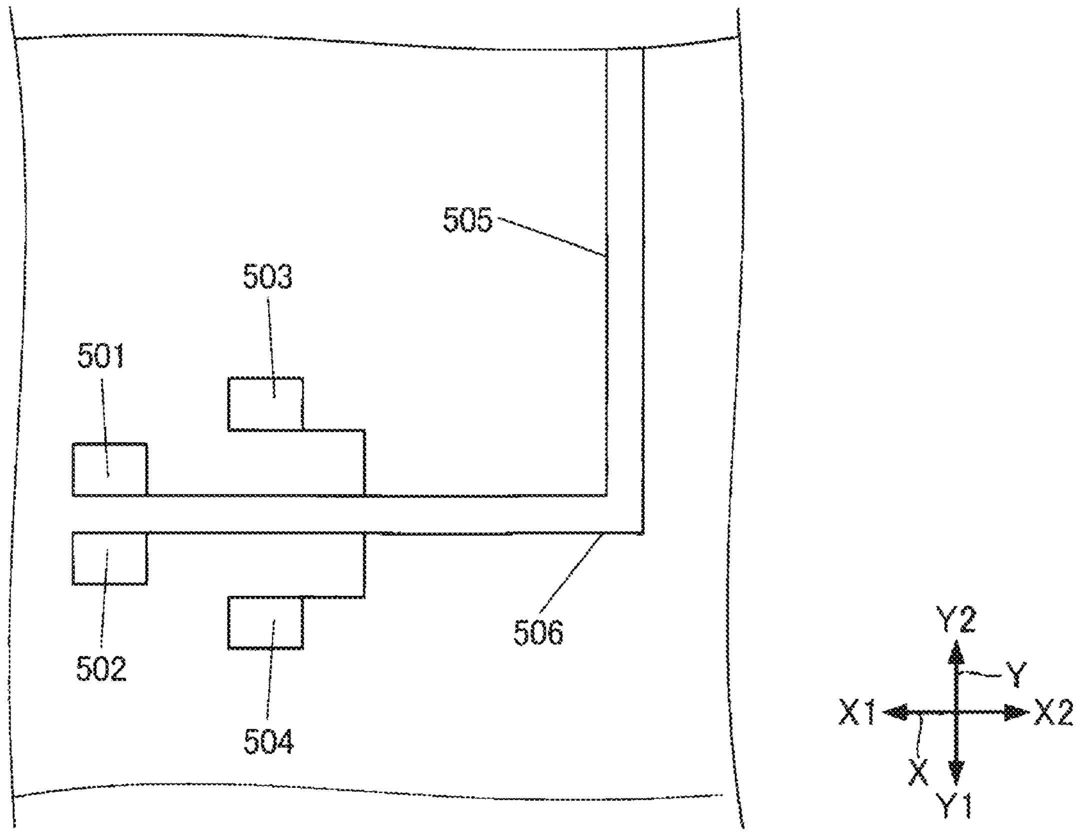
FIG. 9 is a view illustrating a portion of a temperature detection portion in FIG. 2.

FIG. 9 is a diagram illustrating a portion of the temperature detection portion 5. As illustrated in FIG. 9, the temperature detection portion 5 includes a first input terminal 501, a second input terminal 502, a first output terminal 503, and a second output terminal 504 in addition to the first wiring portion 50 described above. For example, a power supply circuit that applies a predetermined voltage to the second wiring portion 60 is coupled to the first input terminal 501 and the second input terminal 502. The first input terminal 501 is coupled to one end of the first wiring portion 50 via the wiring 505, and the second input terminal 502 is coupled to the other end of the first wiring portion 50 via the wiring 506. The first output terminal 503 and the second output terminal 504 are, for example, terminals that take out the output voltage based on the resistance value of the first wiring portion 50, and are coupled to the detection circuit (not illustrated) of the temperature acquisition portion 41 in FIG. 2.

When the temperature of the first wiring portion 50 illustrated in FIG. 5 changes, an external force is applied via the second vibration plate 132 in accordance with the pressure of the absorption chamber S2. Stress corresponding to the external force is applied to the second wiring portion 60. As a result, the second wiring portion 60 is distorted, and the resistance value changes. By using this resistance value, the pressure of the absorption chamber S2 can be detected. The first wiring portion 50 is formed of metal, a semiconductor, or the like.

The temperature of the absorption chamber S2 is detected by using a characteristic that the electric resistance value of metal, a semiconductor, or the like changes depending on the temperature. The temperature acquisition portion 41 in FIG. 2 acquires the temperature of the absorption chamber S2 based on the resistance value of the first wiring portion 50. For example, the temperature acquisition portion 41 includes a detection circuit that acquires a signal based on the resistance value of the first wiring portion 50. The temperature acquisition portion 41 detects the temperature of the absorption chamber S2 based on a correspondence relationship between the electric resistance value of the detection resistor 401 and the temperature. Since the liquid ejecting head 1 includes the first wiring portion 50 and the temperature acquisition portion 41, it is possible to detect the temperature of a desired portion such as the absorption chamber S2.

The first wiring portion 50 is provided at a position that does not correspond to the absorption chamber S2. Therefore, the resistance change due to the pressure of the absorption chamber S2 is not received, and only the resistance change due to the temperature of the absorption chamber S2 is received. Therefore, it is possible to acquire the resistance value based only on the temperature of the absorption chamber S2 with high accuracy by using the first wiring portion 50.

Further, the first wiring portion 50 is provided at a position that does not overlap the pressure chamber S1 and the absorption chamber S2 in a plan view. Therefore, the resistance value of the first wiring portion 50 is less likely to be influenced by the vibration of the first vibration plate 131 and the second vibration plate 132. Since the first wiring portion 50 is provided at the position that does not overlap the pressure chamber S1 and the absorption chamber S2, the first wiring portion 50 is less likely to be influenced by the pressure of the pressure chamber S1 and the absorption chamber S2. As a result, it is possible to measure the temperature in the vicinity of the absorption chamber S2 based on the resistance value of the first wiring portion 50 with high accuracy.

In particular, the first wiring portion 50 is provided at a position between the pressure chamber S1 and the absorption chamber S2 in the X2 direction in a plan view. Therefore, the first wiring portion 50 can be provided in the vicinity of the absorption chamber S2. As a result, it is possible to detect the temperature of the absorption chamber S2 with high accuracy.

The pressure acquisition portion 42 acquires the pressure of the absorption chamber S2 based on the resistance value of the second wiring portion 60 and the temperature acquired by the temperature acquisition portion 41. The second wiring portion 60 is provided corresponding to the absorption chamber S2, and receives the resistance change due to the pressure of the absorption chamber S2 and the temperature in the vicinity of the absorption chamber S2. On the other hand, since the first wiring portion 50 is provided at the position that does not correspond to the absorption chamber S2, the first wiring portion 50 does not receive the resistance change due to the pressure of the absorption chamber S2, and only receives the resistance change due to the temperature in the vicinity of the absorption chamber S2. Therefore, by taking a difference between the resistance value of the second wiring portion 60 and the resistance value of the first wiring portion 50, it is possible to detect only the pressure of the absorption chamber S2 without being influenced by the temperature. As a result, it is possible to measure the pressure of the absorption chamber S2 with high accuracy. As described above, by using the resistance value of the second wiring portion 60, it is possible to cancel the influence of the temperature change in the detection of the absorption chamber S2. As a result, it is possible to enhance the detection accuracy of the pressure.

It was difficult to clearly separate the resistance change due to the distortion caused by the pressure change of the absorption chamber S2 and the resistance change due to the distortion caused by the temperature change. The change rate when the resistance value R of the second wiring portion 60 changes to (R+ΔR) is represented by the following expression [1].

$$\Delta R/R = k\Delta\varepsilon + \alpha\Delta T \quad [1]$$

k in the expression [1] is a gauge ratio. Δε is a distortion change. α is a resistance temperature coefficient. ΔT is a temperature change.

As is understood from the expression [1], the resistance value R of the second wiring portion 60 is caused by the distortion change Δε caused by the pressure and the temperature change ΔT. Therefore, in order to detect the distortion caused by the pressure with high accuracy, it is preferable to reduce the influence of the temperature change. In order to reduce the influence of the temperature change, a material having a large gauge ratio k and a small resistance temperature coefficient α is selected. Examples of such a material include NiCr (nickel chromium).

However, even when a material having a large gauge ratio k and a small resistance temperature coefficient α such as NiCr is used, the influence of the temperature change remains. In addition, for example, when Pt (platinum) being a material which has a large gauge ratio k and easily forms the second wiring portion 60 is used, it is not possible to ignore the influence of the temperature change.

In the present embodiment, as described above, the second wiring portion 60 and the first wiring portion 50 are provided. The second wiring portion 60 is provided corresponding to the absorption chamber S2, and the resistance change of the second wiring portion 60 is represented by the expression [1]. On the other hand, the first wiring portion 50 is provided at the position that does not correspond to the absorption chamber S2.

Therefore, the resistance change of the first wiring portion 50 is represented by the following expression [2] in which Δε=0 in [1].

$$\Delta R/R = \alpha\Delta T \quad [2]$$

The resistance change due to the temperature and the pressure is measured by using the second wiring portion 60, and the resistance change due to only the temperature is measured by using the first wiring portion 50. By subtracting the resistance change of the first wiring portion 50 from the resistance change of the second wiring portion 60, it is possible to acquire the resistance change due to only the pressure.

As described above, by using the second wiring portion 60 and the first wiring portion 50, it is possible to clearly separate two types of the resistance change due to the distortion caused by the pressure change of the absorption chamber S2 and the resistance change due to the distortion caused by the temperature change, from each other. Thus, it is possible to cancel the influence of the temperature change in the detection of the pressure. As a result, it is possible to enhance the detection accuracy of the pressure of the absorption chamber S2.

The first wiring portion 50 and the second wiring portion 60 may be formed of different materials, but are preferably formed of the same material. Since the materials are the same, it is possible to reduce the difference in the characteristics of temperature and pressure due to the difference between the materials. As a result, it is possible to enhance the detection accuracy of the pressure. That is, it is possible to enhance the accuracy of the pressure calculation.

A conductive material is used as the respective materials of the first wiring portion 50 and the second wiring portion 60. Specifically, for example, a conductive metal oxide such as indium tin oxide (ITO), metal such as Pt, iridium (Ir), gold (Au), and titanium (Ti), and an alloy such as NiCr are used. In addition, the first wiring portion 50 and the second wiring portion 60 may be single layers or may be multilayers.

In addition, it is preferable that the first wiring portion 50 and the second wiring portion 60 are formed of the same material as the second electrode 33 of the first piezoelectric member 31. Since the first wiring portion 50 and the second wiring portion 60 are formed in the same shape, it is possible to form the second electrode 33, the first wiring portion 50, and the second wiring portion 60 in the same process, which is simple. Each of the first wiring portion 50 and the second wiring portion 60 may be formed of a material different from that of the second electrode 33.

Further, as illustrated in FIG. 5, the first piezoelectric member 31 and the first electrode 32 are disposed on the first wiring portion 50 and the second wiring portion 60. Therefore, the first wiring portion 50 and the second wiring portion 60 are less likely to be influenced by humidity as compared with a case where the first piezoelectric member 31 and the first electrode 32 are not disposed on the first wiring portion 50 and the second wiring portion 60. As a result, it is possible to enhance the detection accuracy of the pressure.

Further, as described above, at least the plurality of pressure chambers S1 and one absorption chamber S2 that is commonly coupled to the plurality of pressure chambers S1 are provided in the pressure chamber substrate 12. Since the volume of the absorption chamber S2 is larger than the volume of each pressure chamber S1, it is possible to make the planar area of the second vibration plate 132 that forms the absorption chamber S2 be larger than the planar area of each first vibration plate 131 that forms each pressure chamber S1. Therefore, it is possible to make the displacement of the second vibration plate 132 be larger than the displacement of the first vibration plate 131. Therefore, it is possible to enhance the absorption efficiency by the absorption chamber S2. Further, since it is possible to detect the pressure of one absorption chamber S2 commonly coupled to the plurality of pressure chambers S1, it is possible to detect the pressure of the absorption chamber S2 due to the influence of the plurality of pressure chambers S1, instead of the pressure of each pressure chamber S1. As a result, it is possible to use the pressure for problem detection, for example, detection as to whether or not various problems such as insufficient ink supply have occurred.

According to the above-described embodiment, it is possible to acquire the pressure in the vicinity of the pressure chamber S1 by using the absorption chamber S2 which is a space for absorbing the vibration of the ink.

2. Second Embodiment

A second embodiment will be described. In the aspects illustrated below, elements having the same effects or functions as those of the first embodiment described above will be given the reference numerals used in the description of the first embodiment described above, and each of the detailed descriptions thereof will be appropriately omitted.

Figure 10:
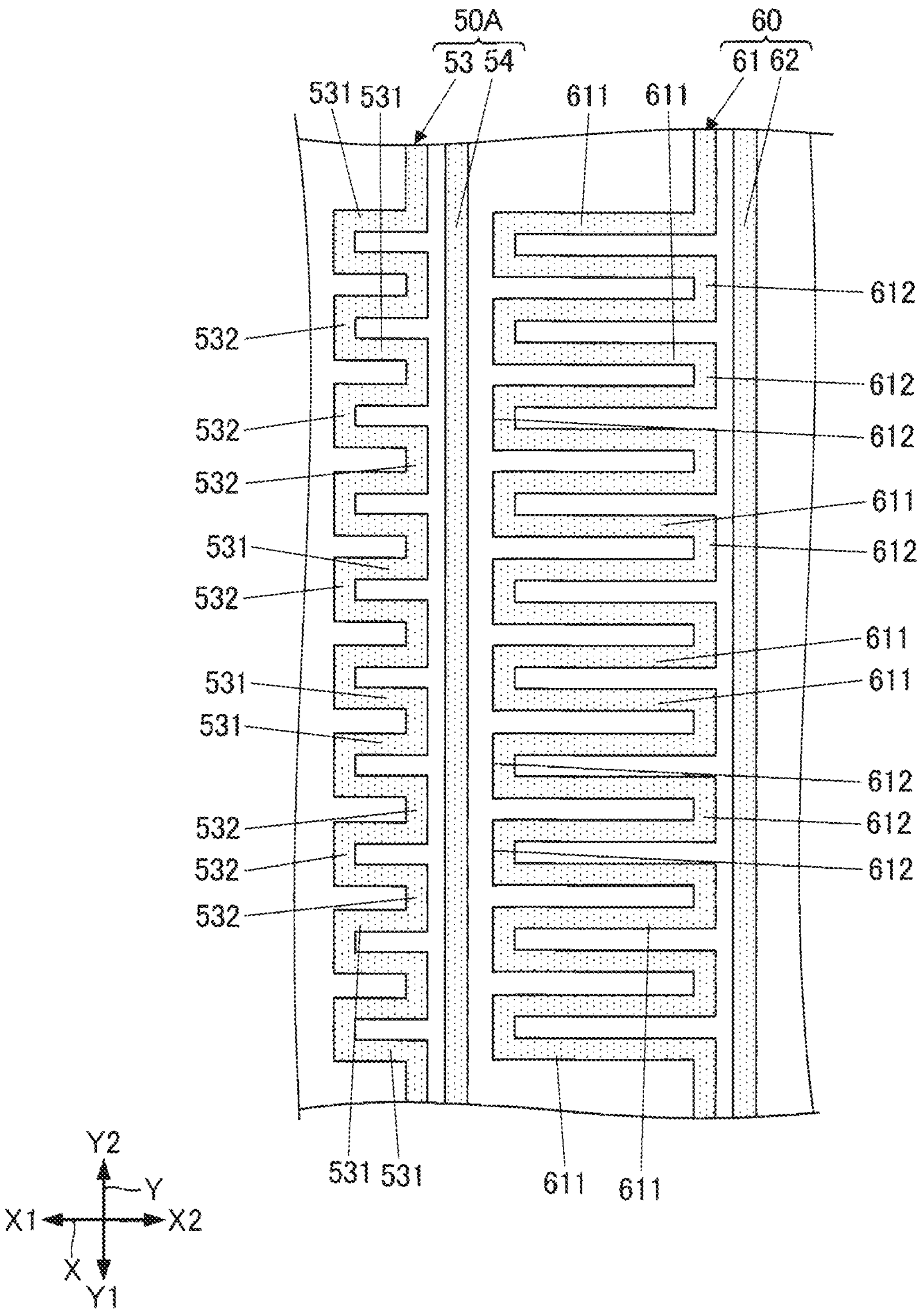
FIG. 10 is a view illustrating a first wiring portion in a second embodiment.

FIG. 10 is a plan view illustrating a first wiring portion 50A in the second embodiment. The first wiring portion 50A in FIG. 10 includes a second bellows portion 53 and a second straight line portion 54. The second bellows portion 53 has a third bellows shape that is sequentially folded along the Y2 direction while extending along the X2 direction. The second straight line portion 54 has a straight line shape extending along the Y2 direction.

The second bellows portion 53 includes a plurality of fifth portions 531 and a plurality of sixth portions 532. The plurality of fifth portions 531 are portions extending in the X2 direction, and are arranged in the Y2 direction to be spaced apart from each other. The plurality of sixth portions 532 are portions extending in the Y2 direction. Each sixth portion 532 is disposed between two adjacent fifth portions 531 and couples the two adjacent fifth portions 531. The plurality of sixth portions 532 are alternately disposed at the end of the fifth portion 531 in the X1 direction and the end of the fifth portion 531 in the X2 direction. The plurality of sixth portions 532 are counted in the Y2 direction by setting the sixth portion 532 located foremost in the Y1 direction among the plurality of sixth portions 532 to be the first. In this case, for example, the odd-numbered sixth portion 532 among the plurality of sixth portions 532 is coupled to the end of the fifth portion 531 in the X1 direction. The even-numbered sixth portion 532 among the plurality of sixth portions 532 is coupled to the end of the fifth portion 531 in the X2 direction.

The second bellows portion 53 of the first wiring portion 50A is configured to have a third bellows shape that is folded sequentially along the Y1 direction while extending along the X2 direction. Therefore, since the second bellows portion 53 has the third bellows shape, it is possible to dispose the first wiring portion 50A to be thin and long. Therefore, it is possible to increase the resistance of the first wiring portion 50A.

In addition, in the third bellows shape of the second bellows portion 53 in the first wiring portion 50A, the length of a portion extending along the X2 direction is shorter than that of the second bellows shape of the first bellows portion 61 in the second wiring portion 60. That is, the length of the fifth portion 531 in the X2 direction is shorter than the length of the first portion 611 in the X2 direction. Therefore, the initial values of the resistance are different between the first wiring portion 50A and the second wiring portion 60. Even when the initial values of the resistance are different, the change rate AR/R is common to the first wiring portion 50A and the second wiring portion 60. Therefore, it is possible to detect only the resistance change due to the pressure by subtraction of the relationship between the expression [1] and the expression [2] described above.

The second wiring portion 60 is used to obtain the resistance value by the change in distortion based on the vibration of the second vibration plate 132 and to detect the pressure of the absorption chamber S2. Therefore, it is preferable that the second wiring portion 60 is disposed in a wide region. On the other hand, when the first wiring portion 50A has the same shape as the second wiring portion 60, there is a concern that the planar area of the vibration plate 13 is increased. Thus, the planar area of the first wiring portion 50A is preferably smaller than the planar area of the second wiring portion 60. From this viewpoint, as in the present embodiment, the length of the fifth portion 531 in the X2 direction is preferably shorter than the length of the first portion 611 in the X2 direction.

3. Third Embodiment

A third embodiment will be described. In the aspects illustrated below, elements having the same effects or functions as those of the first embodiment described above will be given the reference numerals used in the description of the first embodiment described above, and each of the detailed descriptions thereof will be appropriately omitted.

Figure 11:
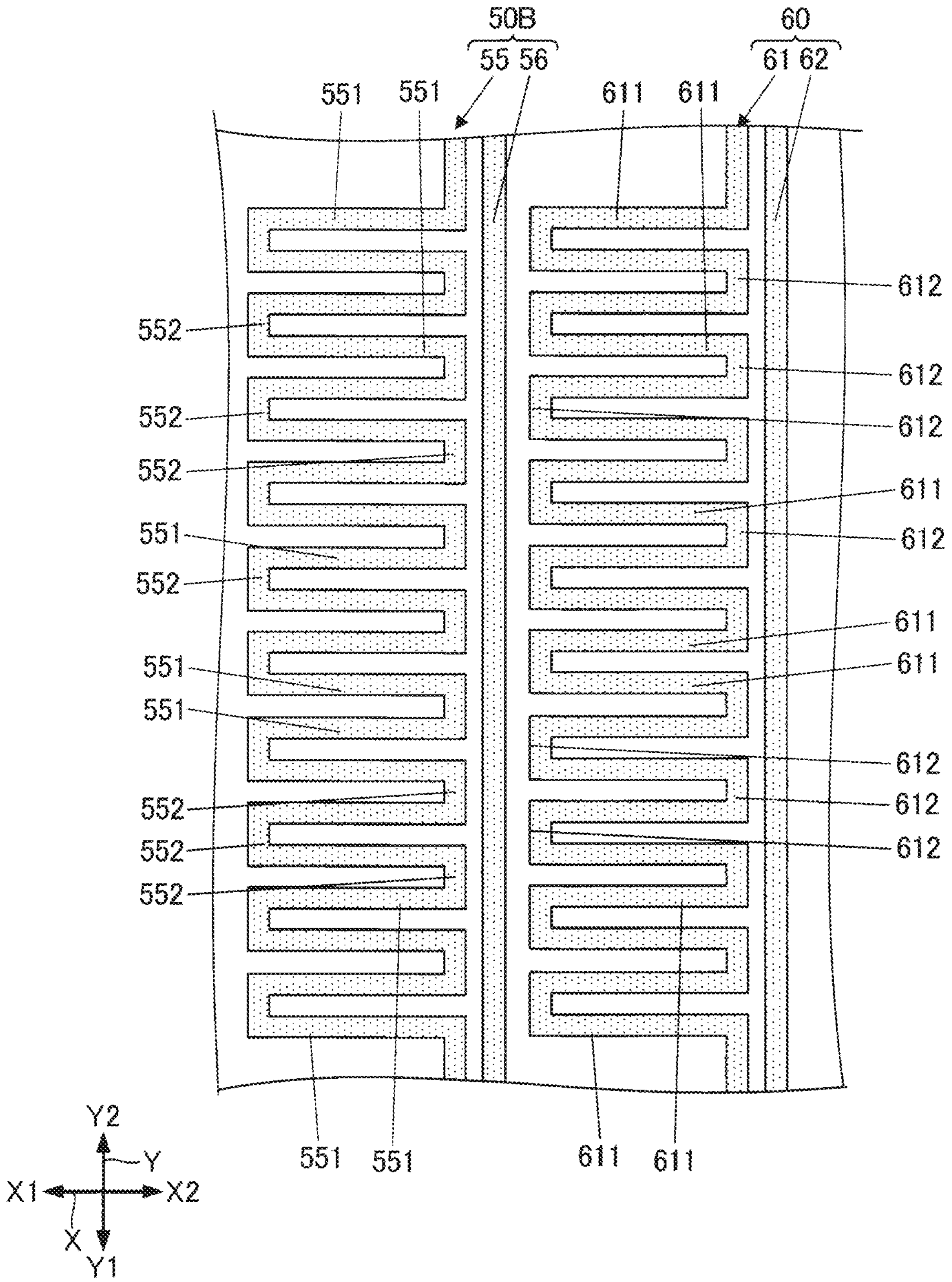
FIG. 11 is a view illustrating a first wiring portion in a third embodiment.

FIG. 11 is a plan view illustrating a first wiring portion 50B in the third embodiment. The first wiring portion 50B in FIG. 11 includes a third bellows portion 55 and a third straight line portion 56. The third bellows portion 55 has a third bellows shape that is sequentially folded along the Y2 direction while extending along the X2 direction. The third straight line portion 56 has a straight line shape extending along the Y2 direction.

The third bellows portion 55 includes a plurality of seventh portions 551 and a plurality of eighth portions 552. The plurality of seventh portions 551 are portions extending in the X2 direction, and are arranged in the Y2 direction to be spaced apart from each other. The plurality of eighth portions 552 are portions extending in the Y2 direction. Each eighth portion 552 is disposed between two adjacent seventh portions 551 and couples the two adjacent seventh portions 551. The plurality of eighth portions 552 are alternately disposed at the end of the seventh portion 551 in the X1 direction and the end of the seventh portion 551 in the X2 direction. The plurality of eighth portions 552 are counted in the Y2 direction by setting the eighth portion 552 located foremost in the Y1 direction among the plurality of eighth portions 552 to be the first. In this case, for example, the odd-numbered eighth portion 552 among the plurality of eighth portions 552 is coupled to the end of the seventh portion 551 in the X1 direction. The even-numbered eighth portion 552 among the plurality of eighth portions 552 is coupled to the end of the seventh portion 551 in the X2 direction.

The third bellows portion 55 of the first wiring portion 50B is configured to have a fourth bellows shape that is folded sequentially in the Y1 direction while extending along the X2 direction. Therefore, since the third bellows portion 55 has the fourth bellows shape, it is possible to dispose the first wiring portion 50B to be thin and long. Therefore, it is possible to increase the resistance of the first wiring portion 50B.

The fourth bellows shape of the third bellows portion 55 is the same as the first bellows shape of the first bellows portion 61 of the second wiring portion 60. Thus, the third bellows portion 55 of the first wiring portion 50B is configured to have the fourth bellows shape in which the length of a portion of the third bellows portion 55, which extends along the X2 direction, is the same as the length of a portion of the first bellows shape of the first bellows portion 61, which extends along the X2 direction. That is, the length of the seventh portion 551 in the X2 direction is the same as the length of the first portion 611 in the X2 direction.

Since the fourth bellows shape of the third bellows portion 55 is the same as the first bellows shape of the first bellows portion 61 are the same, the initial resistance values of the first wiring portion 50B and the second wiring portion 60 are the same when the pressure is not applied to the first wiring portion 50B and the second wiring portion 60, and the temperature is an equilibrium state. Therefore, it is possible to detect the pressure change in the absorption chamber S2 by simply subtraction between the resistance value of the first wiring portion 50B and the resistance value of the second wiring portion 60.

4. Modification Example

The embodiments described above may be variously modified. A specific modification form that can be applied to the above-described embodiment will be described below. Two or more forms freely selected from the following examples can be appropriately combined in a range without contradictory.

Figure 12:
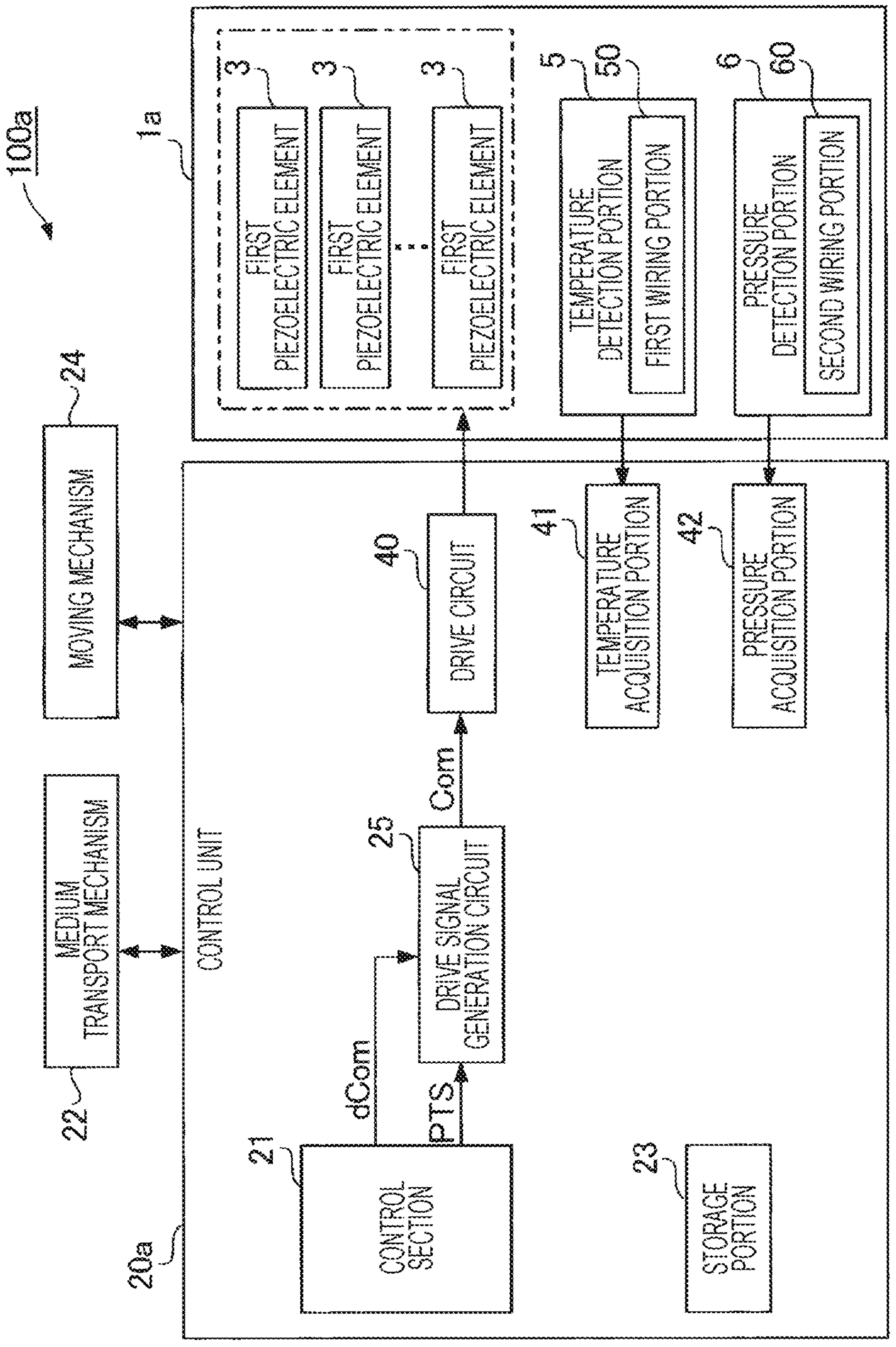
FIG. 12 is a block diagram of a liquid ejecting apparatus in a modification example.

FIG. 12 is a block diagram of a liquid ejecting apparatus 100*a* in the modification example. The liquid ejecting apparatus 100*a* includes a liquid ejecting head 1*a* and a control unit 20*a*. The drive circuit 40, the temperature acquisition portion 41, and the pressure acquisition portion 42 are provided in the control unit 20*a*. The temperature acquisition portion 41 and the pressure acquisition portion 42 are not provided in the liquid ejecting head 1*a*.

As illustrated in FIG. 12, each of the drive circuit 40, the temperature acquisition portion 41, and the pressure acquisition portion 42 may be provided in the control unit 20 in part or in whole. Also with the liquid ejecting apparatus 100*a*, the pressure in the vicinity of the pressure chamber S1 can be acquired by using the absorption chamber S2 which is a space for absorbing the vibration of the ink, as in each of the embodiments.

The shape of each of the second wiring portion” and the first wiring portion” is preferably a shape that is likely to receive stress due to the deformation of the first vibration plate 131 or the second vibration plate 132, and is not limited to the bellows shape.

In addition, the liquid ejecting head” may be a circulation type head having a so-called circulation flow path.

Figure 13:
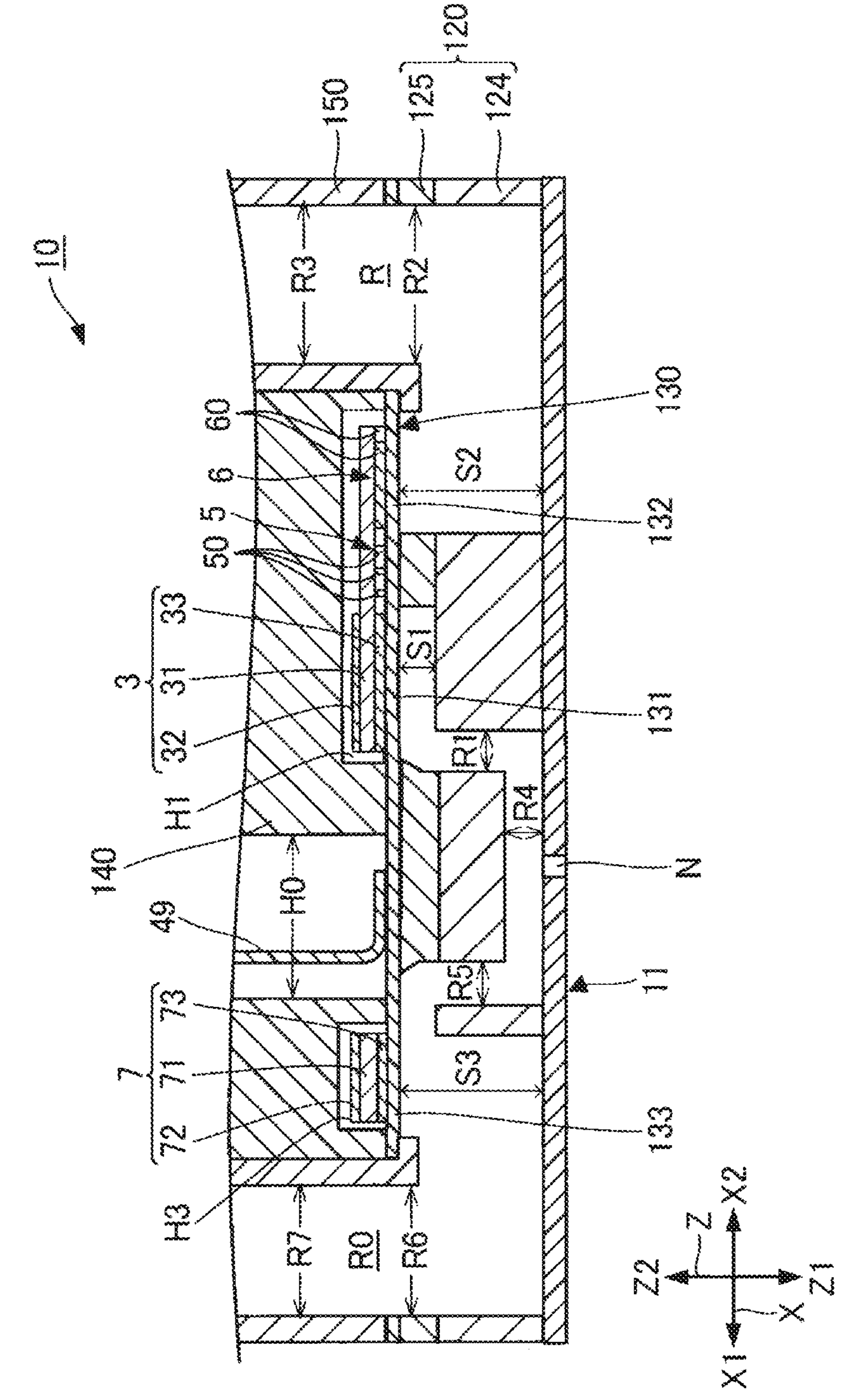
FIG. 13 is a partial cross-sectional view of a liquid ejecting head in the modification example.

FIG. 13 is a partial cross-sectional view of a liquid ejecting head 10 in the modification example. The liquid ejecting head 10 illustrated in FIG. 13 includes a nozzle substrate 11, a pressure chamber substrate 120, a vibration plate 130, a sealing substrate 140, a case 150, a wiring substrate 49, a first piezoelectric element 3, a pressure detection portion 6, a temperature detection portion 5, and a second piezoelectric element 7. The liquid ejecting head 10 in FIG. 13 is a circulation type head having a so-called circulation flow path.

The pressure chamber substrate 120 is a laminate of a third substrate 124 and a fourth substrate 125. These substrates are manufactured by processing a semiconductor substrate such as a single crystal substrate of silicon, for example. A plurality of fourth communication flow paths R4, a plurality of fifth communication flow paths R5, a sixth communication flow path R6, and a discharge-side absorption chamber S3 are formed in the pressure chamber substrate 120 in addition to a plurality of pressure chambers S1, an absorption chamber S2, a plurality of first communication flow paths R1, and a second communication flow path R2. The absorption chamber S2 is a supply-side absorption chamber.

One of the first communication flow paths R1 communicates with one of the fifth communication flow paths R5 via one of the fourth communication flow paths R4. Each of the fourth communication flow paths R4 overlaps the nozzle N in a plan view. Each of the fifth communication flow paths R5 communicates with the discharge-side absorption chamber S3. The discharge-side absorption chamber S3 overlaps the second piezoelectric element 7 in a plan view. The plurality of discharge-side absorption chambers S3 communicate with the sixth communication flow path R6.

The vibration plate 130 includes a third vibration plate 133 in addition to the plurality of first vibration plates 131 and the second vibration plate 132. The third vibration plate 133 is a portion of the vibration plate 130, which overlaps the discharge-side absorption chamber S3 in a plan view.

The case 150 is in contact with the sealing substrate 140. The case 150 and the sealing substrate 140 may be integrated. The third communication flow path R3 and the seventh communication flow path R7 are formed in the case 150. The common ink chamber R0 is formed in the seventh communication flow path R7 and the sixth communication flow path R6.

A second space H3 is formed in the sealing substrate 140 in addition to the first space H1 and the wiring space H0. The second piezoelectric element 7 is disposed in the second space H3. The second piezoelectric element 7 is disposed on the surface of the third vibration plate 133 opposite to the discharge-side absorption chamber S3. The second piezoelectric element 7 is used to detect the pressure of the discharge-side absorption chamber S3. The second piezoelectric element 7 is deformed in response to the third vibration plate 133 that bends in accordance with the pressure of the discharge-side absorption chamber S3.

The second piezoelectric element 7 includes a third electrode 72, a second piezoelectric member 71, and a fourth electrode 73. These components are elongated along the Y-axis. The fourth electrode 73, the second piezoelectric member 71, and the third electrode 72 are stacked in this order from the third vibration plate 133. The second piezoelectric member 71 is formed of a known piezoelectric material such as lead zirconate titanate, for example. Each of the third electrode 72 and the fourth electrode 73 is formed of a conductive material such as platinum or iridium, for example. The second piezoelectric element 7 is not provided for applying pressure to a liquid in the flow path, but is provided for absorbing the vibration.

The third vibration plate 133, the second piezoelectric element 7, and the discharge-side absorption chamber S3 are elongated along the Y-axis and are provided for the plurality of pressure chambers S1, but may be provided for each pressure chamber S1. Thus, a plurality of the third vibration plates 133, a plurality of the second piezoelectric elements 7, and a plurality of the discharge-side absorption chambers S3 may be provided.

In the liquid ejecting head 10, the ink flows to the pressure chamber S1 via the common ink chamber R and the absorption chamber S2. The pressure in the pressure chamber S1 fluctuates by driving the first piezoelectric element 3, and the ink is ejected from the nozzle N as ink droplets via the first communication flow path R1 and the fourth communication flow path R4 due to the fluctuation of the pressure. At the same time, the ink flows back through the fifth communication flow path R5, the discharge-side absorption chamber S3, and the common ink chamber R0. In this manner, the ink is circulated.

In addition, in the liquid ejecting head 10, the absorption chamber S2 is provided in the X2 direction with respect to the pressure chamber S1, and the discharge-side absorption chamber S3 is provided in the X1 direction with respect to the pressure chamber S1. That is, a vibration absorption mechanism is provided on the supply side and the discharge side of the ink with respect to the pressure chamber S1. Further, a distance between the absorption chamber S2 and the pressure chamber S1 is shorter than a distance between the discharge-side absorption chamber S3 and the pressure chamber S1. The pressure detection portion 6 is provided for the absorption chamber S2 closer to the pressure chamber S1. Therefore, since the pressure in the vicinity of the pressure chamber S1 is detected by using the absorption chamber S2 closer to the pressure chamber S1, it is possible to detect the behavior and the like of the ink corresponding to the pressure of the pressure chamber S1 with higher accuracy.

The "liquid ejecting apparatus" can be adopted in various devices such as a facsimile machine and a copying machine, in addition to a device dedicated to printing. Use of the liquid ejecting apparatus is not limited to printing. For example, a liquid ejecting apparatus that ejects a solution of a coloring material is used as a manufacturing apparatus that forms a color filter of a display apparatus such as a liquid crystal display panel. In addition, a liquid ejecting apparatus that ejects a solution of a conductive material is used as a manufacturing apparatus that forms a wire or an electrode of a wiring substrate. In addition, a liquid ejecting apparatus that ejects a solution of an organic substance related to a living body is utilized as a manufacturing apparatus that manufactures a biochip, for example.

The present disclosure is described based on the preferred embodiments, but the present disclosure is not limited to the above-described embodiments. The configuration of each portion of the present disclosure can be replaced with any configuration that has the same function as the above-described embodiments, and any configuration can be added.

What is claimed is:

1. A liquid ejecting head comprising:

a nozzle substrate that is provided with a nozzle for ejecting a liquid;

a pressure chamber substrate that includes a pressure chamber in which pressure for ejecting the liquid from the nozzle is applied to the liquid, and an absorption chamber that is adjacent to the pressure chamber in a second direction and absorbs vibration of the liquid generated when the pressure is applied to the liquid in the pressure chamber;

a first vibration plate that is provided corresponding to the pressure chamber and vibrates to apply the pressure to the liquid;

a first wiring portion that is provided at a position that does not correspond to the absorption chamber;

a second vibration plate that is provided corresponding to the absorption chamber and vibrates to absorb the pressure of the liquid;

a second wiring portion that is provided at a position corresponding to the absorption chamber;

a pressure acquisition portion that acquires the pressure of the absorption chamber based on a resistance value of the second wiring portion; and a temperature acquisition portion that acquires a temperature of the absorption chamber based on a resistance value of the first wiring portion, wherein the pressure acquisition portion acquires the pressure of the absorption chamber based on the resistance value of the second wiring portion and the temperature acquired by the temperature acquisition portion.

2. The liquid ejecting head according to claim 1, wherein the pressure chamber substrate is provided with at least a plurality of the pressure chambers arranged in a first direction intersecting the second direction, and one absorption chamber commonly coupled to the plurality of the pressure chambers.

3. A liquid ejecting head comprising:

a nozzle substrate that is provided with a nozzle for ejecting a liquid;

a pressure chamber substrate that includes a pressure chamber in which pressure for ejecting the liquid from the nozzle is applied to the liquid, and an absorption chamber that is adjacent to the pressure chamber in a second direction and absorbs vibration of the liquid generated when the pressure is applied to the liquid in the pressure chamber;

a first vibration plate that is provided corresponding to the pressure chamber and vibrates to apply the pressure to the liquid;

a second vibration plate that is provided corresponding to the absorption chamber and vibrates to absorb the pressure of the liquid;

a wiring portion that is provided at a position corresponding to the absorption chamber; and a pressure acquisition portion that acquires the pressure of the absorption chamber based on a resistance value of the second wiring portion, wherein the wiring portion is configured to have a second bellows shape that is folded sequentially while extending along the second direction.

4. A liquid ejecting head comprising:

a nozzle substrate that is provided with a nozzle for ejecting a liquid;

a pressure chamber substrate that includes a pressure chamber in which pressure for ejecting the liquid from the nozzle is applied to the liquid, and an absorption chamber that is adjacent to the pressure chamber in a second direction and absorbs vibration of the liquid generated when the pressure is applied to the liquid in the pressure chamber;

a first vibration plate that is provided corresponding to the pressure chamber and vibrates to apply the pressure to the liquid;

a first wiring portion that is provided at a position that does not correspond to the absorption chamber;

a second vibration plate that is provided corresponding to the absorption chamber and vibrates to absorb the pressure of the liquid;

a second wiring portion that is provided at a position corresponding to the absorption chamber; and a pressure acquisition portion that acquires the pressure of the absorption chamber based on a resistance value of the second wiring portion, wherein when viewed in an up-down direction intersecting the first direction and the second direction, the second wiring portion is provided at a position overlapping the absorption chamber, the first wiring portion is provided at a position that does not overlap the pressure chamber and the absorption chamber, and the first wiring portion is provided at a position between the pressure chamber and the absorption chamber in the second direction.

5. The liquid ejecting head according to claim 1, wherein the first wiring portion is configured to have a first bellows shape that is folded sequentially while extending along the first direction.

6. The liquid ejecting head according to claim 1, wherein the second wiring portion is configured to have a second bellows shape that is folded sequentially while extending along the second direction, and the first wiring portion is configured to have a third bellows shape that is folded sequentially while extending along the second direction, the third bellows shape in which a length of a portion extending along the second direction is shorter than that of the second bellows shape.

7. The liquid ejecting head according to claim 1, wherein the second wiring portion is configured to have a second bellows shape that is folded sequentially while extending along the second direction, and the first wiring portion is configured to have a fourth bellows shape that is folded sequentially while extending along the second direction, the fourth bellows shape in which a length of a portion extending along the second direction is equal to that of the second bellows shape.

8. The liquid ejecting head according to claim 1, wherein the first vibration plate and the second vibration plate are not separated from each other and are formed by a continuous member.

9. The liquid ejecting head according to claim 1, wherein the first wiring portion and the second wiring portion are formed of the same material.

10. The liquid ejecting head according to claim 1, further comprising:

a first piezoelectric member that is provided at a position corresponding to the pressure chamber and provided above the first vibration plate;

a first electrode that is provided above the first piezoelectric member; and a second electrode that is provided below the first piezoelectric member, wherein the first wiring portion and the second wiring portion are formed of the same material as the second electrode.

* * * * *